United States Patent
Sunada

(10) Patent No.: US 11,165,922 B2
(45) Date of Patent: Nov. 2, 2021

(54) IMAGE READING APPARATUS

(71) Applicant: CANON KABUSHIKI KAISHA, Tokyo (JP)

(72) Inventor: Hidenori Sunada, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/107,470

(22) Filed: Nov. 30, 2020

(65) Prior Publication Data
US 2021/0176373 A1 Jun. 10, 2021

(30) Foreign Application Priority Data
Dec. 9, 2019 (JP) .............................. JP2019-222399

(51) Int. Cl.
H04N 1/00 (2006.01)
H04N 1/60 (2006.01)

(52) U.S. Cl.
CPC ..... H04N 1/00602 (2013.01); H04N 1/00689 (2013.01); H04N 1/00694 (2013.01); H04N 1/6027 (2013.01); H04N 1/6075 (2013.01)

(58) Field of Classification Search
CPC ........... H04N 1/00602; H04N 1/00689; H04N 1/00694; H04N 1/6027; H04N 1/6075; H04N 2201/04791; H04N 1/00588; H04N 2201/0081; H04N 1/0473; H04N 1/12; H04N 1/193; H04N 2201/0094; H04N 1/0057; H04N 1/00037; H04N 2201/04755; H04N 2201/04794; H04N 1/00013; H04N 1/00814; H04N 1/121; H04N 1/1215; H04N 1/125; H04N 1/3263; H04N 2201/02416; H04N 2201/02439; H04N 2201/03108; H04N 2201/0471; H04N 2201/0432; H04N 1/00745; H04N 1/00748; H04N 1/0032; H04N 1/00551; H04N 1/00652; H04N 1/00705; H04N 1/00777; H04N 1/1013; H04N 1/1017; H04N 1/1061; H04N 1/17; H04N 1/32667; H04N 1/401; H04N 1/4076; H04N 2201/04703; H04N 2201/04737; H04N 1/00567; H04N 1/00591;
(Continued)

(56) References Cited

U.S. PATENT DOCUMENTS 8,842,346 B2 * 9/2014 Honda ............... H04N 1/00814 358/496
10,491,768 B2 11/2019 Andoh et al. ...... H04N 1/00774
(Continued)

Primary Examiner — Negussie Worku
(74) Attorney, Agent, or Firm — Venable LLP

(57) ABSTRACT

An image reading apparatus configured to read an image of an original, the image reading apparatus includes an original tray on which the original is to be placed; a pickup roller configured to feed the original placed on the original tray to a conveyance path; a first conveyance roller configured to convey the original which is fed to the conveyance path by the pickup roller; a second conveyance roller, which is located downstream of the first conveyance roller in a conveying direction in which the original is conveyed, configured to convey the original which is conveyed by the first conveyance roller; and a reading unit configured to read, at a reading position, an image of the original being conveyed by the first conveyance roller, the reading position being a position located downstream of the second conveyance roller in the conveying direction.

5 Claims, 22 Drawing Sheets

(58) Field of Classification Search
CPC .... H04N 1/0066; H04N 1/00824; H04N 1/00; H04N 1/00002; H04N 1/00018; H04N 1/00058; H04N 1/00076; H04N 1/00082; H04N 1/00084; H04N 1/00092; H04N 1/00413; H04N 1/00572; H04N 1/0058; H04N 1/00583; H04N 1/0061; H04N 1/00615; H04N 1/00639; H04N 1/00641; H04N 1/00687; H04N 1/00697; H04N 1/0071; H04N 1/00713; H04N 1/00732; H04N 1/00734; H04N 1/0075; H04N 1/00755; H04N 1/00774; H04N 1/00782; H04N 1/00795; H04N 1/00798; H04N 1/00811; H04N 1/00843; H04N 1/00848; H04N 1/00896; H04N 1/00917; H04N 1/00923; H04N 1/0464; H04N 1/047; H04N 1/053; H04N 1/1026; H04N 1/123; H04N 1/1275; H04N 1/19; H04N 1/195; H04N 1/2032; H04N 1/2307; H04N 1/2346; H04N 1/2376; H04N 1/32358; H04N 1/32448; H04N 1/32561; H04N 1/32587; H04N 1/32593; H04N 1/32609; H04N 1/387; H04N 1/40; H04N 1/4097; H04N 2201/0093; H04N 2201/0098; H04N 2201/02425; H04N 2201/03162; H04N 2201/0436; H04N 2201/044; H04N 2201/0458; H04N 2201/04717; H04N 2201/04724; H04N 2201/04725; H04N 2201/04731; H04N 2201/04734; H04N 2201/04787; H04N 2201/04789; H04N 2201/04793; H04N 2201/214; H04N 2201/329; H04N 1/00623; H04N 1/00628; H04N 1/00649; H04N 1/00681; H04N 1/00702; H04N 1/4015; H04N 1/4078; H04N 1/6033; H04N 1/0062; B65H 2220/01; B65H 2220/02; B65H 2220/08; B65H 2220/11; B65H 2511/20; B65H 2511/212; B65H 2511/232; B65H 2511/30; B65H 2511/40; B65H 2511/411; B65H 2513/50; B65H 2513/512; B65H 2513/514; B65H 2515/34; B65H 2701/1313; B65H 2220/03; B65H 2801/39; B65H 2402/10; B65H 2403/25; B65H 2403/512; B65H 2404/2693; B65H 2405/324; B65H 2511/51; B65H 2511/514; B65H 2515/81; B65H 2551/20; B65H 2801/06; B65H 29/00; B65H 3/047; B65H 3/06; B65H 3/0607; B65H 3/0669; B65H 3/0684; B65H 3/5261; B65H 43/00; B65H 5/021; B65H 5/025; B65H 7/00; B65H 7/02; B65H 1/08; B65H 3/0646; B65H 3/40; B65H 5/062; B65H 9/002; B65H 9/006; B65H 9/20; G03G 15/6564; G03G 15/6567; G03G 15/2053; G03G 15/206; G03G 15/6529; G03G 2215/00447; G03G 15/1605; G03G 15/1665; G03G 15/1675; G03G 15/23; G03G 15/231; G03G 15/6508; G03G 15/652; G03G 15/6582; G03G 2215/00818; G03G 2215/00936; G03G 15/1645; G03G 15/5025; G03G 15/6535; G03G 15/6561; G03G 2215/004; G03G 2215/00405; G03G 2215/00409; G03G 2215/00556; G03G 2215/00599; G03G 2215/00945
USPC .......................................................... 358/498
See application file for complete search history.

(56) References Cited

U.S. PATENT DOCUMENTS

| | | | |
|---|---|---|---|
| 2013/0135699 A1* | 5/2013 | Katto | B65H 7/02 358/498 |
| 2014/0168731 A1* | 6/2014 | Nakayoshi | H04N 1/00588 358/498 |
| 2018/0183968 A1* | 6/2018 | Furukawa | H04N 1/00697 |
| 2018/0343349 A1* | 11/2018 | Shiokawa | H04N 1/00824 |

\* cited by examiner

| PAGE NUMBER |
| COLOR/ BLACK AND WHITE |
| READING SIZE |
| PLATEN /FRONT/BACK |
| RESOLUTION |
| READING STATE | ns
IMAGE READING APPARATUS

BACKGROUND OF THE INVENTION

Field of the Invention

The present disclosure relates to an image reading apparatus configured to read an image from an original.

Description of the Related Art

In general, an image reading apparatus to be used for a copying machine or another such apparatus includes an automatic document feeder (ADF). The ADF is configured to feed originals placed on an original tray one by one. The image reading apparatus is configured to irradiate an original conveyed on a conveyance path by the ADF with light and receive the light reflected by an original surface by a reading sensor through intermediation of optical parts including a reflective mirror and a lens, to thereby read an image printed on the original to generate image data.

In U.S. Pat. No. 10,491,768 (B2), there is disclosed an ADF configured to drive a plurality of conveyance rollers by a single motor to feed an original. This ADF includes a clutch in its drive system. In U.S. Pat. No. 10,491,768 (B2), in a case where an abutment sensor provided between a feed roller and a first conveyance roller downstream of the feed roller detects an original, a free capacity of a memory configured to store image data is examined. In a case where the free capacity of the memory is smaller than a capacity for storing the image data on one original, an original is stopped between the feed roller and the first conveyance roller, and an original being read is delivered to the outside of the machine. The first original in an original reading job is conveyed without being stopped between the feed roller and the first conveyance roller because the free capacity of the memory is larger than the capacity for storing the image data on one original.

In recent years, there has been known a configuration in which, in order to improve productivity of the image reading apparatus, feeding of an original is started, in conjunction with a timing at which the shading processing is estimated to be completed, before shading processing of the reading sensor is completed.

In a case where the configuration in which the feeding of the original is started before the shading processing is completed is applied to U.S. Pat. No. 10,491,768 (B2), the following problem may occur. That is, for example, in a case where an error occurs in the shading processing and a retry operation is performed, the original adversely reaches a reading position before the shading processing is completed. With the configuration disclosed in U.S. Pat. No. 10,491,768 (B2), the first original is not stopped, and is therefore delivered to the outside of the machine without being read. In addition, in a case where the feeding of the original is started after the shading processing is completed in order to prevent the original from not being read, the productivity of the image reading apparatus deteriorates. The present disclosure has been made in view of such problems, and has an object to prevent an original being conveyed from not being read.

SUMMARY OF THE INVENTION

An image reading apparatus configured to read an image of an original according to the present disclosure includes an original tray on which the original is to be placed; a pickup roller configured to feed the original placed on the original tray to a conveyance path; a first conveyance roller configured to convey the original which is fed to the conveyance path by the pickup roller; a second conveyance roller, which is located downstream of the first conveyance roller in a conveying direction in which the original is conveyed, configured to convey the original which is conveyed by the first conveyance roller; a reading unit configured to read, at a reading position, an image of the original being conveyed by the first conveyance roller, the reading position being a position located downstream of the second conveyance roller in the conveying direction; a memory configured to store image data representing the image of the original read by the reading unit; a third conveyance roller configured to convey the original from which the image has been read by the reading unit; a motor configured to drive the pickup roller, the first conveyance roller, the second conveyance roller, and the third conveyance roller; a drive force transmitter configured to be switched between a first state and a second state, the first state being a state in which a drive force of the motor is transmitted to the pickup roller and the first conveyance roller and the second state being a state in which the drive force of the motor is prevented from being transmitted to the pickup roller and the first conveyance roller; a receiver configured to receive an instruction indicating a start of a reading job for reading the image of the original; and a controller configured to control conveyance of the original, the controller being configured to start to feed the original placed on the original tray based on the instruction received by the receiver, wherein the controller is configured to control, in a case where a capacity of the memory becomes smaller than a predetermined amount during execution of the reading job, conveyance of a first original being read by the reading unit to be continuously conveyed and conveyance of a second original succeeding the first original to stop at a first position by switching the drive force transmitter from the first state to the second state, and wherein the controller is configured to control a third original to stop at a second position in a case where conveyance of the third original is to be stopped during a period from a timing the conveyance of the third original is started until a timing the third original reaches the reading position, the third original being an original which is read by the reading unit at a first time in the reading job, the second position being a position located downstream of the first position in the conveying direction.

Further features of the present invention will become apparent from the following description of exemplary embodiments (with reference to the attached drawings).

DESCRIPTION OF THE EMBODIMENTS

In the following, embodiments of the present disclosure are described with reference to the drawings. However, shapes of components described in the embodiments, and their relative positions and the like are subject to appropriate change in accordance with a configuration and various conditions of an apparatus to which the present disclosure is applied. Accordingly, it is not intended to limit the scope of the present disclosure only to the following embodiments.

First Embodiment

Figure 1:
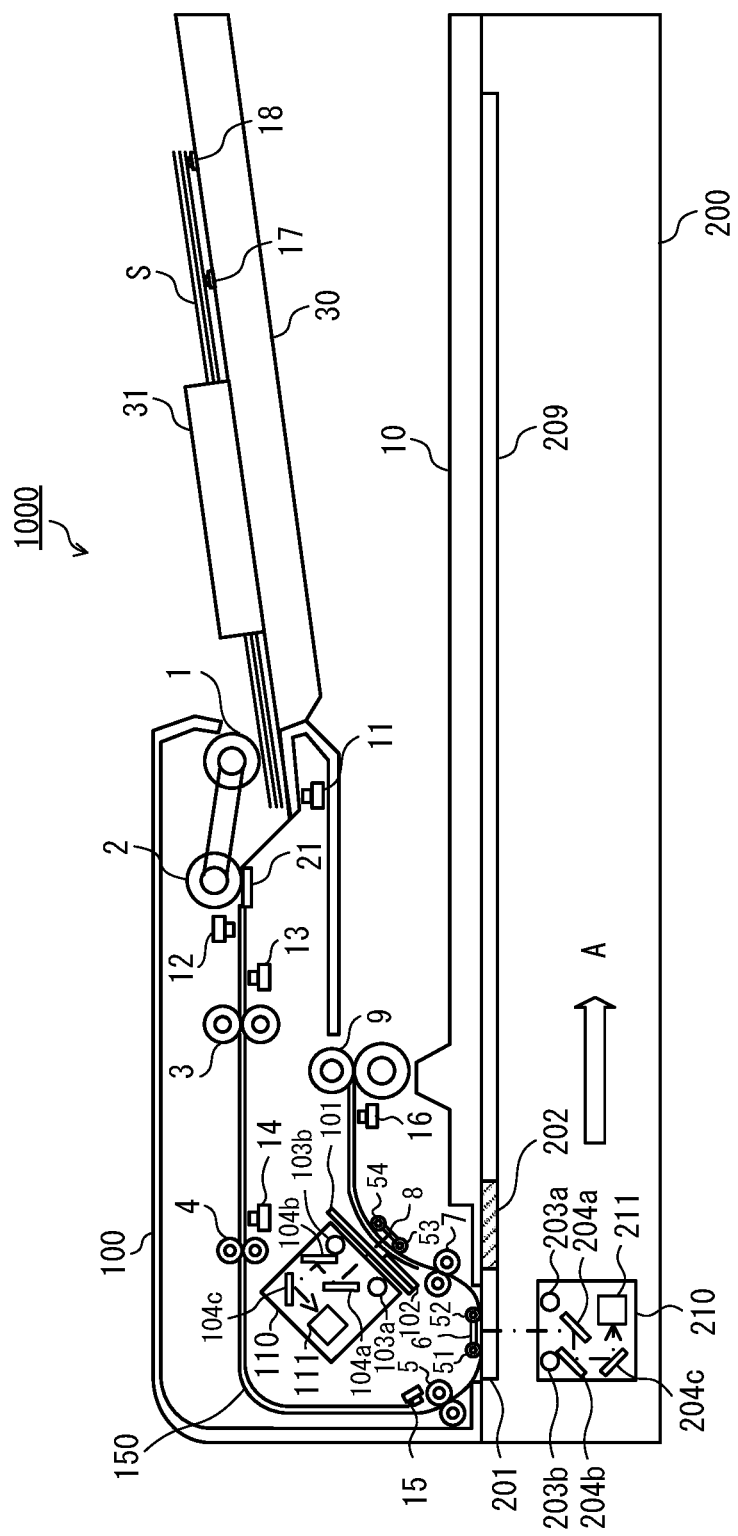
FIG. 1 is a configuration diagram of an image reading apparatus according to a first embodiment of the present disclosure.

FIG. 1 is a configuration diagram of an image reading apparatus according to a first embodiment of the present disclosure. An image reading apparatus 1000 includes a reading apparatus (reader 200) and an ADF 100. The image reading apparatus 1000 has its operation controlled by a controller described later. The ADF 100 is mounted to a casing of the reader 200 by a hinge (not shown). The casing of the reader 200 supports a platen 209 and a flow reading glass 201. The ADF 100 can be opened and closed with respect to the platen 209 and the flow reading glass 201 by being pivoted by the hinge (not shown). In the casing of the reader 200, a shading white plate 202 is provided between the platen 209 and the flow reading glass 201.

In the first embodiment, the reader 200 includes a reading unit 210 in the casing. The reading unit 210 is configured to read an image formed on one surface of an original to generate image data representing the read image. The ADF 100 includes a reading unit 110. The reading unit 110 is configured to read an image formed on the other surface of the original to generate image data representing the read image.

The ADF 100 includes an original tray 30 configured to receive an original bundle S made of one or more sheet-like originals to be stacked thereon, a conveyance path 150 configured to allow conveyance of the original, and a delivery tray 10 configured to receive the original to be delivered thereto after being subjected to the reading.

The original tray 30 is provided with original guide plates 31, which are movable in a direction (width direction) perpendicular to an original conveying direction. The original guide plates 31 are brought into abutment against end portions of the original in a width direction to regulate a position of the original in the width direction. In the first embodiment, a configuration in which two original guide plates 31 are provided in order to regulate both ends of the original in the width direction is described. However, a configuration in which one original guide plate 31 is provided so as to regulate only one end portion of the original in the width direction may be employed. In a case where one original guide plate 31 is provided, the other end portion of the original in the width direction is regulated by a fixed regulating plate.

The two original guide plates 31 are configured such that one original guide plate 31 moves in conjunction with the movement of the other original guide plate 31 by a linkage mechanism (not shown) provided inside the original tray 30. In the first embodiment, the original has a conveyance center at its center in the width direction. The two original guide plates 31 are brought closer to or farther from the center in the width direction. Therefore, the conveyance center of the original matches the center in the width direction irrespective of a size of the original.

The original tray 30 are provided with original length sensors 17 and 18 at different positions in the original conveying direction (longitudinal direction). The original length sensors 17 and 18 are each configured to detect presence or absence of an original. The original length sensors 17 and 18 provided at different positions in the conveying direction enable an approximate length (original length) in the original conveying direction to be detected based on a detection result of the presence or absence of the original obtained by each of the original length sensors 17 and 18. For example, in a case where the original length sensor 17 detects the original and the original length sensor 18 does not detect the original, it is determined that the original length is equal to or larger than a length from a base end of the original tray 30 to a position of the original length sensor 17 and smaller than a length from the base end of the original tray 30 to a position of the original length sensor 18.

The original tray 30 is provided with an original presence detecting sensor 11 configured to detect the presence or absence of an original. It is determined based on a detection result obtained by the original presence detecting sensor 11 whether or not an original is placed on the original tray 30. The original presence detecting sensor 11 is arranged in a base end portion of the original tray 30 so as to be able to detect an original having any size.

The ADF 100 includes a pickup roller 1, a separation roller 2, a separation pad 21, drawing rollers 3, conveyance rollers 4, lead rollers 5, lead rollers 7, and delivery rollers 9 on the conveyance path 150 in the stated order from the upstream side in the original conveying direction.

The pickup roller 1 is provided to a rotation shaft of the separation roller 2 so as to freely swing. In a case where the original is to be fed from the original tray 30, the pickup roller 1 is caused to fall onto a surface of the uppermost original of the original bundle S and to rotate. In a case where the original is not to be fed, the pickup roller 1 is retreated upward so as not to hinder the placement of the original onto the original tray 30. The pickup roller 1 is caused to fall onto the surface of the original and to rotate, to thereby take in the uppermost original of the original bundle S placed on the original tray 30 to convey the original to the separation roller 2. The separation roller 2 is configured to separate the originals into individual sheets by a separation nip portion formed between the separation roller 2 and the separation pad 21. The separation of the original is a known separation technology.

The original separated into one sheet by the separation roller 2 and the separation pad 21 is conveyed to the conveyance rollers 4 by the drawing rollers 3. The lead rollers 5 are configured to convey the original conveyed by the conveyance rollers 4 to a reading position (upper portion of the flow reading glass 201) of the reading unit 210.

The flow reading glass 201 is located at the reading position of the reading unit 210 to be used in a case where an image of the original conveyed by the ADF 100 is to be read. A white opposing member 6 is provided at a position facing the reading unit 210 across the flow reading glass 201. A front surface reading upstream roller 51 is provided on upstream of the opposing member 6, and a front surface reading downstream roller 52 is provided on downstream of the opposing member 6. The original is conveyed between the flow reading glass 201 and the opposing member 6 by the front surface reading upstream roller 51. The reading unit 210 is configured to read, line by line, an image on a first surface (front surface) of the original from the original passing between the flow reading glass 201 and the opposing member 6 through intermediation of the flow reading glass 201.

The original that has passed through the reading position of the reading unit 210 is conveyed to the lead rollers 7 by the front surface reading downstream roller 52. The original is conveyed from the reading position of the reading unit 210 to the reading position of the reading unit 110 by the lead rollers 7. A flow reading glass 101 is provided at the reading position of the reading unit 110. A shading white plate 102 is provided to the flow reading glass 101. A white opposing member 8 is provided at a position facing the reading unit 110 across the flow reading glass 101. A back surface reading upstream roller 53 is provided on upstream of the opposing member 8, and a back surface reading downstream roller 54 is provided on downstream of the opposing member 8. The original is conveyed between the flow reading glass 101 and the opposing member 8 by the back surface reading upstream roller 53. The reading unit 110 is configured to read an image on a second surface (back surface) of the original passing between the flow reading glass 101 and the opposing member 8.

The original that has passed through the reading position of the reading unit 110 is conveyed by the back surface reading downstream roller 54 to the delivery rollers 9 provided on the downstream side. The delivery rollers 9 are configured to deliver the original to the delivery tray 10. In a case where an original image on one surface of the original is to be read, the reading unit 210 reads the original image on the first surface of the original, and the reading unit 110 does not operate. In a case where original images on both surfaces of the original are to be read, the reading unit 210 reads the original image on the first surface of the original, and the reading unit 110 reads the original image on the second surface of the original line by line.

A method of reading an image from an original being conveyed by the ADF 100 as described above is referred to as "flow reading."

The original is placed on the platen 209 of the reader 200 with its image formation surface facing the platen 209 side. In this case, the reading unit 210 reads the image of the original placed on the platen 209 line by line while moving in a direction indicated by an arrow A at a constant speed. Processing for reading the image of the original on the platen 209 is referred to as "fixed reading."

The reading unit 210 includes light emitting diodes (LEDs) 203a and 203b being light sources, reflective mirrors 204a to 204c, and a reading sensor 211. The LEDs 203a and 203b are configured to irradiate the original passing above the flow reading glass 201 with light. Irradiation light, which is obtained by irradiating the original with light, is reflected by the reflective mirrors 204a to 204c to be received by the reading sensor 211. The reading sensor 211 includes a plurality of photoelectric conversion elements arranged side by side in a direction (width direction) perpendicular to the direction indicated by the arrow A. The reading sensor 211 is configured to perform predetermined processing on electric signals obtained by photoelectrically converting the reflected light received by the plurality of photoelectric conversion elements, to thereby generate image data. This image data represents the image on the first surface of the original. The image data is generated each time the image is read by one line. The direction in which the photoelectric conversion elements are arranged is a main scanning direction. The direction indicated by the arrow A is a sub-scanning direction. The main scanning direction corresponds to the width direction. The sub-scanning direction corresponds to the longitudinal direction.

The reading unit 110 has the same configuration as that of the reading unit 210, and reads the original image on the second surface of the original by the same operation. That is, the reading unit 110 includes LEDs 103a and 103b being light sources, reflective mirrors 104a to 104c, and a reading sensor 111. The LEDs 103a and 103b are configured to irradiate the original passing between the flow reading glass 101 and the opposing member 8 with light. Irradiation light, which is obtained by irradiating the original with light, is reflected by the reflective mirrors 104a to 104c to be received by the reading sensor 111. The reading sensor 111 is configured to perform predetermined processing on electric signals obtained by photoelectrically converting the reflected light received by the plurality of photoelectric conversion elements, to thereby generate image data. The image data is generated each time the image is read by one line. This image data represents the image on the second surface of the original.

The shading white plates 102 and 202 are each a member to be used during shading processing and each serve as a white reference. The shading processing using the shading white plate 102 is performed before the start of the image reading. The shading white plate 102 is located at the reading position of the reading unit 110 after the flow reading glass 101 is moved during the shading processing, and falls out of the reading position of the reading unit 110 after the flow reading glass 101 is moved during the flow reading. The shading processing using the shading white plate 102 is performed before the start of the image reading in both cases of the fixed reading and the flow reading.

A separation sensor 12, a drawing sensor 13, a registration sensor 14, a lead sensor 15, and a delivery sensor 16 are provided on the conveyance path 150 in the stated order from the upstream side in the original conveying direction. The conveyance of the original is controlled depending on detection results obtained by the separation sensor 12, the drawing sensor 13, and the registration sensor 14. Timings at which the reading unit 210 and the reading unit 110 start reading operations are determined depending on a detection result obtained by the lead sensor 15. The delivery of the original is detected depending on a detection result obtained by the delivery sensor 16.

Control System

Figure 2:
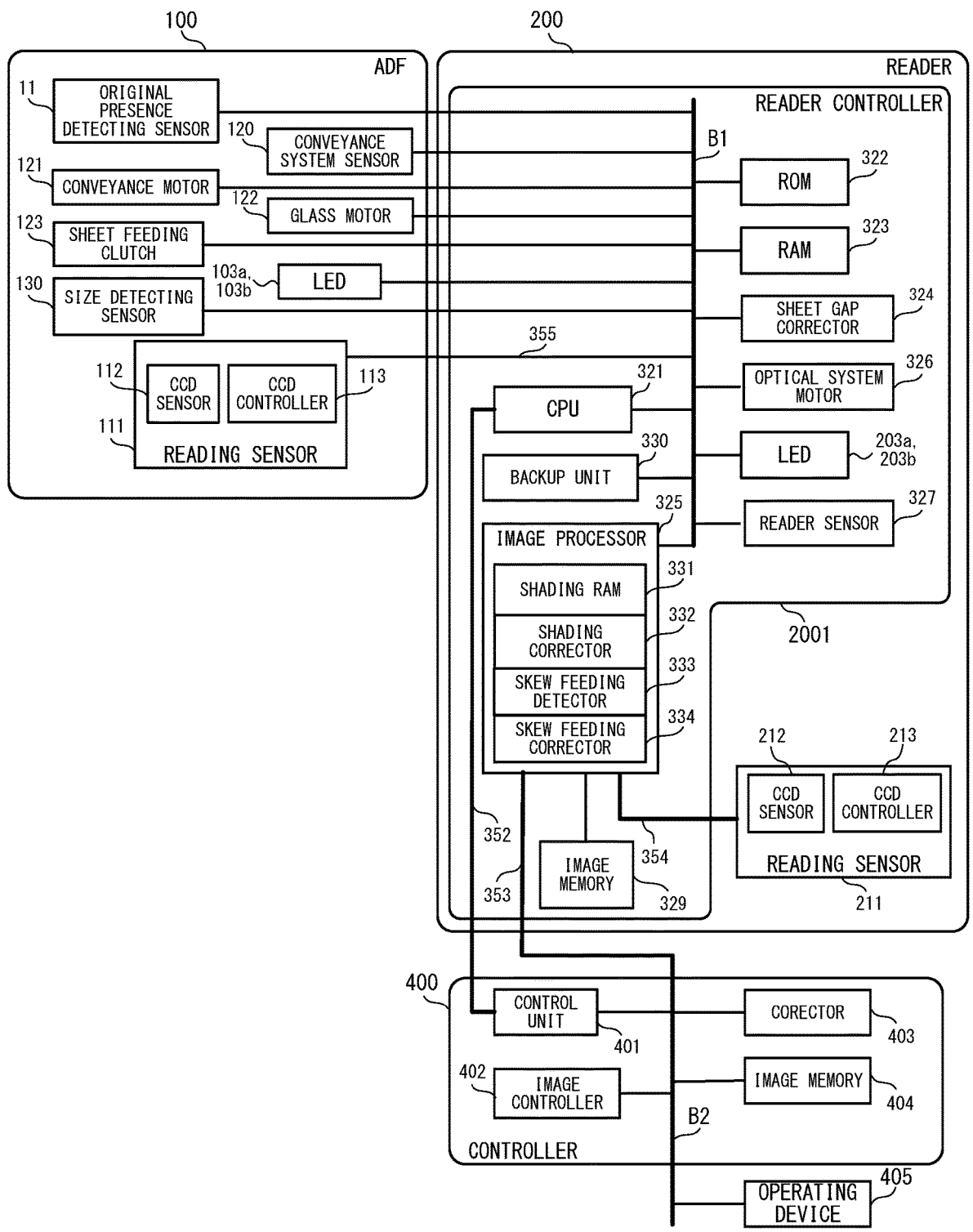
FIG. 2 is a configuration diagram of a control system.

FIG. 2 is a configuration diagram of a control system configured to control an operation of the image reading apparatus 1000. The control system includes: a reader controller 2001 configured to control operations of the ADF 100 and the reader 200; and a controller 400. The reader controller 2001 is provided to the reader 200. The controller 400 may be provided to the reader 200, but may be provided to an image forming apparatus when, for example, the image reading apparatus 1000 is combined with an image forming apparatus to form a copying machine or another such apparatus.

The reader controller 2001 includes a central processing unit (CPU) 321, a read only memory (ROM) 322, and a random access memory (RAM) 323. The CPU 321 is configured to control the operations of the ADF 100 and the reader 200 by executing a computer program stored in the ROM 322. The RAM 323 provides a work area to be used for the execution of the computer program. The CPU 321, the ROM 322, and the RAM 323 are connected to each other so as to enable communication therebetween through a bus B1.

A sheet gap corrector 324, an optical system motor 326, the LEDs 203a and 203b, a reader sensor 327, a backup unit 330, and an image processor 325 are connected to the bus B1. The reader sensor 327 is, for example, a pressure plate opening/closing detecting sensor configured to detect the opening and closing of the ADF 100 or a pressure plate size detecting sensor configured to detect a length of the original placed on the platen 209. The image processor 325 is connected to an image memory 329 and the reading sensor 211. The backup unit 330 is configured to back up, for example, a part of work data and setting values for each machine, which are used for controlling the image reading apparatus 1000. The optical system motor 326 is a drive source configured to move the reading unit 210 in the direction indicated by the arrow A. The sheet gap corrector 324 is configured to correct a distance (sheet gap) between a trailing edge of a preceding original and a leading edge of an original subsequent to the preceding original.

The image processor 325 includes a shading RAM 331, a shading corrector 332, a skew feeding detector 333, and a skew feeding corrector 334. The image processor 325 is configured to subject the image data acquired from the reading unit 210 and the reading unit 110 to various kinds of image processing including shading processing, detection and correction processing for a streaked image or another such foreign particle image on the image data, and detection and correction processing for an inclination amount of the original. The image memory 329 provides a work area to be used for the image processing. Pieces of image data subjected to the image processing are sequentially transmitted to the controller 400 through a controller interface image communication line 353 including a clock signal line for image transfer. The CPU 321 transmits an image leading edge signal, which is a reference of a leading edge of the image data, to the controller 400 by adjusting its timing through a controller interface control communication line 352.

The LEDs 203a and 203b are configured to emit light under control of the CPU 321 to irradiate the original with light. Reflected light of the light that has irradiated the original is received by the reading sensor 211 to be converted into image data. The reading sensor 211 includes a light receiving sensor and a controller for the light receiving sensor. In the first embodiment, a charge coupled device (CCD) sensor 212 is used as the light receiving sensor. A CCD controller 213 is a controller for the light receiving sensor, and is configured to drive and control the CCD sensor 212. The CCD sensor 212 is configured to convert the reflected light into image data to transmit the image data to the image processor 325 through an image data communication line 354 under control of the CCD controller 213.

The bus B1 is also connected to components of the ADF 100. Specifically, the bus B1 is connected to the original presence detecting sensor 11, a conveyance system sensor 120, a conveyance motor 121, a glass motor 122, a sheet feeding clutch 123, the LEDs 103a and 103b, a size detecting sensor 130, and the reading sensor 111.

The conveyance system sensor 120 includes the separation sensor 12, the drawing sensor 13, the registration sensor 14, the lead sensor 15, and the delivery sensor 16, which are provided on the conveyance path 150 of the ADF 100. The conveyance motor 121 is a drive source, which is configured to drive each roller for feeding an original, and is provided on the transfer path 150. The glass motor 122 is a drive source configured to move the flow reading glass 101. The sheet feeding clutch 123 is provided between the pickup roller 1 and the conveyance motor 121, and is configured to transmit and interrupt a drive force applied from the conveyance motor 121 to the pickup roller 1. The size detecting sensor 130 is a sensor configured to detect the size of the original placed on the original tray 30, and includes the original length sensors 17 and 18 and a sensor (not shown) configured to detect a distance between the two original guide plates 31.

The CPU 321 controls the conveyance motor 121 and the sheet feeding clutch 123 to perform conveyance control for an original in accordance with a timing at which the conveyance system sensor 120 detects the original. The CPU 321 can also detect the presence or absence of an original on the original tray 30 based on the detection result obtained by the original presence detecting sensor 11 and detect the size (original width and original length) of the original placed on the original tray 30 based on a detection result obtained by the size detecting sensor 130. In a case where the original is to be read by the reading unit 110, the CPU 321 causes the glass motor 122 to move the flow reading glass 101 to a reading region, and causes the LEDs 103a and 103b to emit light.

The reading sensor 111 includes a light receiving sensor and a controller for the light receiving sensor. In the first embodiment, a CCD sensor 112 is used as the light receiving sensor. A CCD controller 113 is a controller for the light receiving sensor, and is configured to drive and control the CCD sensor 112. The CCD sensor 112 is configured to convert the reflected light into image data to transmit the image data to the image processor 325 through an image data communication line 355 and the bus B1 under control of the CCD controller 113.

The controller 400 includes a control unit 401, an image controller 402, a corrector 403, and an image memory 404. The control unit 401, the image controller 402, the corrector 403, and the image memory 404 are connected to each other so as to enable communication therebetween through a bus B2. The bus B2 is also connected to an operating device 405. The controller 400 is configured to control an overall operation of the image reading apparatus 1000. The control unit 401 is configured to control an operation of each component of the image reading apparatus 1000 by executing a predetermined computer program. The image controller 402 is configured to perform image control including scaling and rotation on the image data acquired from the reader controller 2001. The corrector 403 is configured to perform correction including color hue correction on the image data processed by the image controller 402 to store the corrected image data in the image memory 404. In this manner, the image data representing the image of the original read by each of the reading units 110 and 210 is subjected to various kinds of processing by the image processor 325, the image controller 402, and the corrector 403 to be stored in the image memory 404.

The operating device 405 is a user interface including an input interface and an output interface. Examples of the input interface include various key buttons and a touch panel. Examples of the output interface include a display and a speaker. A user can use the input interface to input an image reading instruction and various settings at a time of image reading. The user can use the output interface to examine a screen in a case where each kind of input is performed.

Modification Example of Image Reading Apparatus

Figure 3:
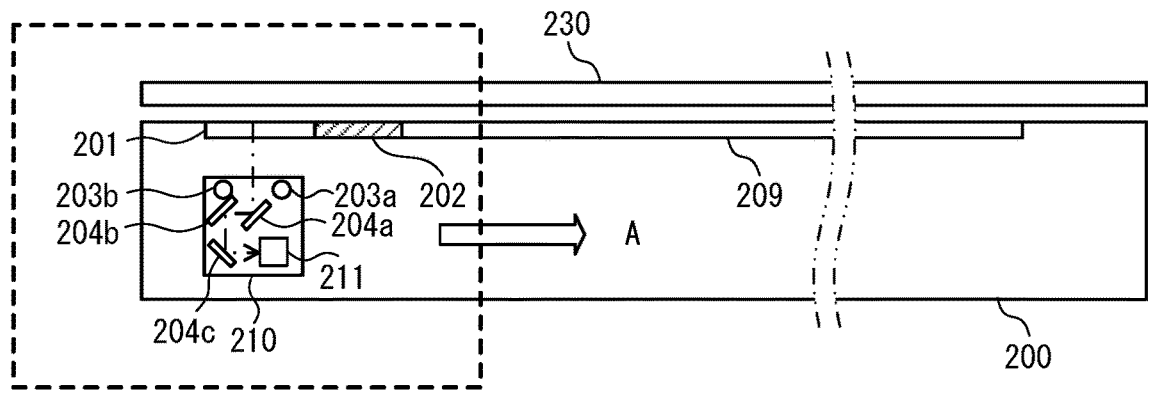
FIG. 3 is a configuration diagram of an image reading apparatus according to a modification example of the present disclosure.

FIG. 3 is a configuration diagram of an image reading apparatus according to a modification example of the present disclosure. The image reading apparatus illustrated in FIG. 3 is an example in which the ADF 100 illustrated in FIG. 1 is changed to a pressure plate 230. With a configuration including the pressure plate 230, only the fixed reading is performed, and the flow reading is not performed.

Processing During Flow Reading

Figure 4:
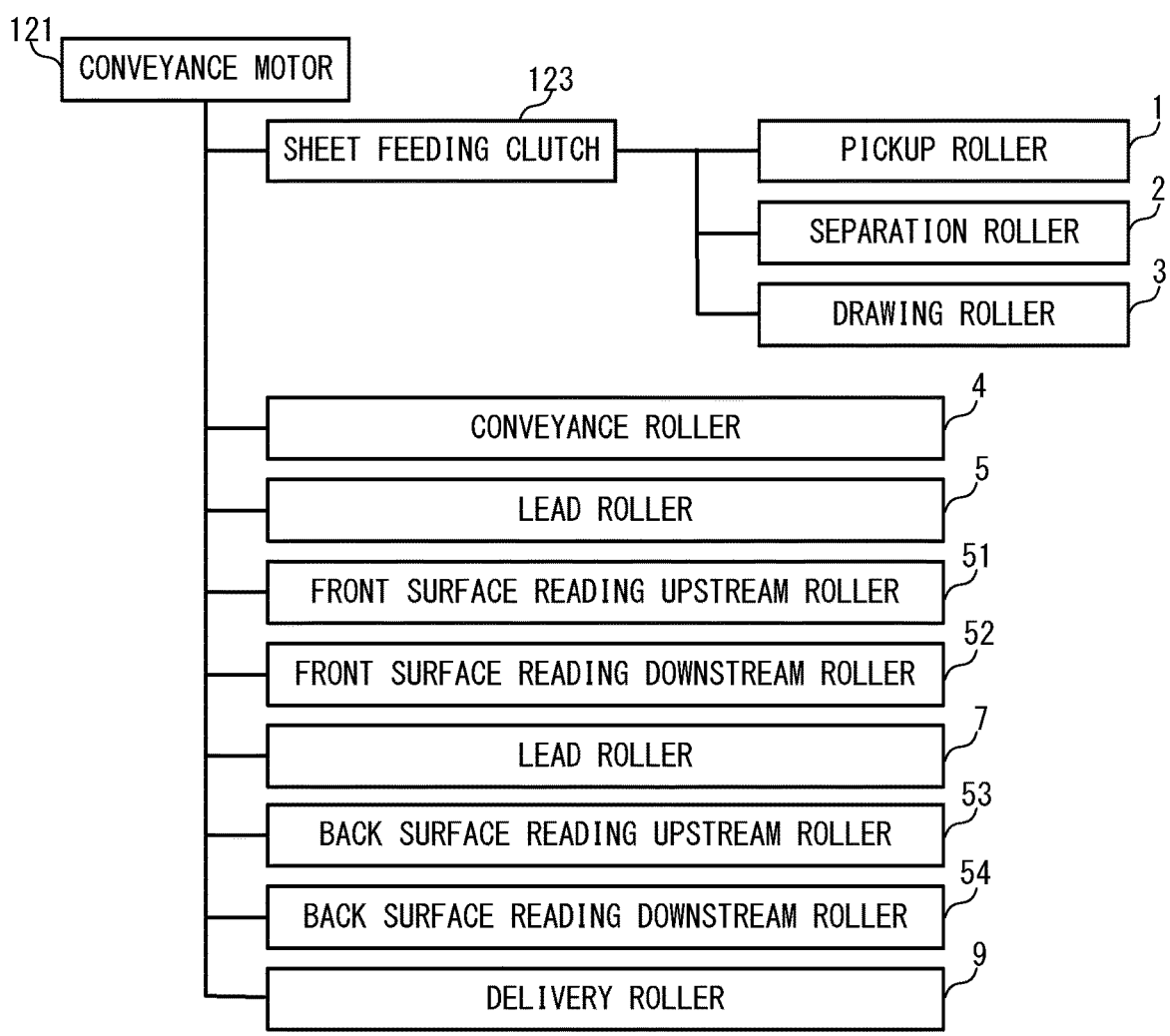
FIG. 4 is an explanatory diagram of an original conveying mechanism.

FIG. 4 is an explanatory diagram of an original conveying mechanism used for the conveyance control for the original being conveyed by the ADF 100. The original is conveyed by the pickup roller 1, the separation roller 2, the drawing rollers 3, the conveyance rollers 4, the lead rollers 5, the front surface reading upstream roller 51, the front surface reading downstream roller 52, the lead rollers 7, the back surface reading upstream roller 53, the back surface reading downstream roller 54, and the delivery rollers 9 as illustrated in FIG. 1. As described above with reference to FIG. 2, each roller is driven to rotate by the conveyance motor 121. The conveyance motor 121 serves as a drive source for all the rollers. The pickup roller 1, the separation roller 2, and the drawing rollers 3 are connected to the conveyance motor 121 through intermediation of the sheet feeding clutch 123. Therefore, the pickup roller 1, the separation roller 2, and the drawing rollers 3 are configured to transmit the drive force by being coupled to the sheet feeding clutch 123. In this manner, in the original conveying mechanism, the conveyance control for the original is performed by the conveyance motor 121, which is one drive source, and the sheet feeding clutch 123, which is one drive force transmitter.

<In a Case where an Image on One Side of an Original is to be Read by Flow Reading (Single-Sided Flow Reading)>

As described above, the original bundle S made of one or more originals is stacked on the original tray 30. In a case where the original is to be fed, the conveyance motor 121 is rotated to couple the feeding clutch 123 to each roller. In a case where the drive force is transmitted through intermediation of the sheet feeding clutch 123, the pickup roller 1 is caused to fall onto an original surface of the uppermost original of the original bundle S stacked on the original tray 30 and to rotate. Thus, the original on the uppermost surface of the original bundle S is fed. The fed originals are separated into individual sheets by the separation roller 2 and the separation pad 21.

The originals separated into individual sheets are each conveyed to the conveyance rollers 4 by the drawing rollers 3. It is determined that a leading edge of the original has reached the conveyance rollers 4 in a case where a predetermined time period has elapsed since the registration sensor 14 detects the leading edge of the original. When a predetermined margin time has elapsed since the leading edge of the original reaches the conveyance rollers 4, the sheet feeding clutch 123 is cut off to stop the rotation of the pickup roller 1 on the original tray 30. This inhibits the subsequent original from being fed. The separation roller 2 and the drawing rollers 3 are also stopped at the same timing as the pickup roller 1, and hence the fed original is conveyed only by the conveyance rollers 4 for a certain time period.

The conveyance path 150 configured to convey the original that has passed through the conveyance rollers 4 in a direction toward the flow reading glass 201 is provided on downstream of the conveyance rollers 4. The original that has been conveyed through the conveyance path 150 is conveyed by the lead rollers 5 and the front surface reading upstream roller 51 to the reading position for the first surface (front surface) to be read by the reading unit 210. While the original is passing between the flow reading glass 201 and the opposing member 6, the image on the first surface (front surface) is read line by line by the reading unit 210.

The original that has passed through the reading position for the first surface (front surface) is conveyed to the lead rollers 7 by the front surface reading downstream roller 52. The original is further conveyed by the lead rollers 7, the back surface reading upstream roller 53, and the back surface reading downstream roller 54, and is then delivered onto the delivery tray 10 by the delivery rollers 9. In this manner, the single-sided flow reading for one original is performed. In a case where are a plurality of originals on the original tray 30, the above-mentioned operation is repeatedly performed until the single-sided flow reading for the final original is finished.

<In a Case where an Image on Both Sides of an Original is to be Read by Flow Reading Double-Sided Flow Reading>

The reading processing for the first surface (front surface) is the same as that performed during the single-sided flow reading. The original conveyed to the lead rollers 7 by the front surface reading downstream roller 52 is conveyed by the lead rollers 5 and the front surface reading upstream roller 51 to the reading position for the second surface (back surface) to be read by the reading unit 110. Before the original reaches the reading position for the second surface (back surface), the flow reading glass 101 is moved to a position illustrated in FIG. 1 by the glass motor 122. While the original is passing between the flow reading glass 101 and the opposing member 8, the image on the second surface (back surface) is read line by line by the reading unit 110.

The original that has passed through the reading position for the second surface (back surface) is conveyed by the back surface reading downstream roller 54, and is then delivered onto the delivery tray 10 by the delivery rollers 9. In this manner, the double-sided flow reading for one original is performed. In a case where are a plurality of originals on the original tray 30, the above-mentioned operation is repeatedly performed until the double-sided flow reading for the final original is finished.

Conveyance Control for Original

As described above, the rollers used for conveying the original are driven to rotate by the conveyance motor 121 serving as the drive source. Of those, the pickup roller 1, the separation roller 2, and the drawing rollers 3 start to be rotated not only by the rotation of the conveyance motor 121 but also by being coupled to the sheet feeding clutch 123. Processing steps of feeding, separating, conveying, reading, and delivering an original are each performed based on the presence or absence of the original or the detection result of the position of the original on the conveyance path 150, which is obtained by the conveyance system sensor 120.

In particular, a start timing of the processing step of reading the first surface by the reading unit 210 is determined based on a detection timing at which the leading edge of the original being conveyed is detected by the lead sensor 15 and a distance from the lead sensor 15 to the reading position for the first surface (front surface). In the same manner, a start timing of the processing step of reading the second surface by the reading unit 110 is determined based on the detection timing at which the leading edge of the original being conveyed is detected by the lead sensor 15 and a distance from the lead sensor 15 to the reading position for the second surface (back surface).

In the feeding operation for the original performed by the ADF 100, the CPU 321 periodically monitors the detection results (detection signals) obtained by the separation sensor 12, the drawing sensor 13, the registration sensor 14, the lead sensor 15, and the delivery sensor 16. In a case where the detection signal obtained by each sensor stays unchanged for a predetermined time period or longer during the feeding operation for the original, the CPU 321 determines that a jam has occurred as an original transfer abnormality. In a case where a jam occurs, the CPU 321 uses the operating device 405 to notify the user of the occurrence of the jam and a location at which the jam has occurred. The location of the jam is determined based on a position of the sensor exhibiting no change in the detection signal.

Shading Control

Figure 5:
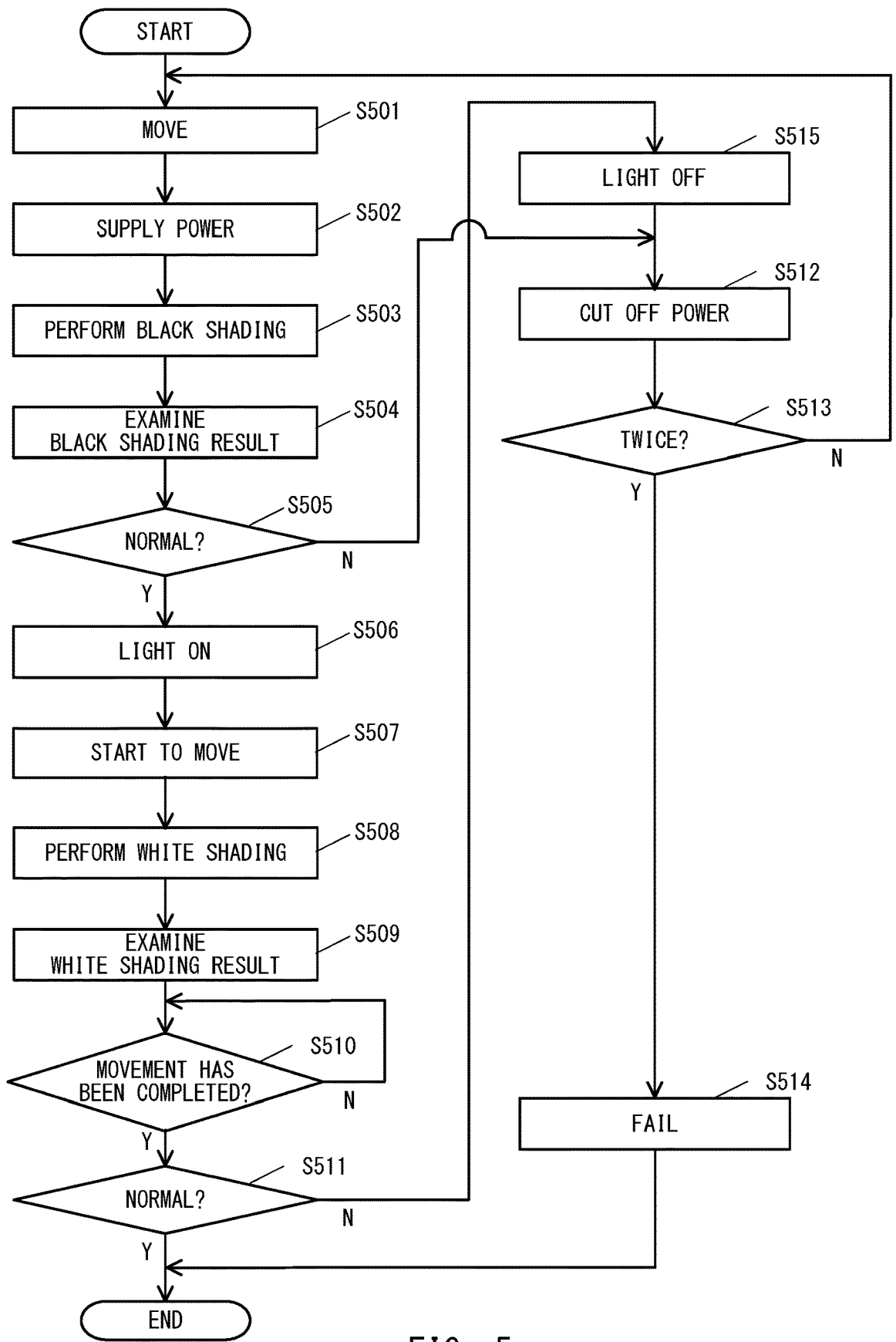
FIG. 5 is a flow chart for illustrating shading control processing.

The shading white plates 202 and 102 are white plates for creating a reference data on a white level to be used for shading control. The shading control is performed before the original is read. In the shading control, the shading white plate 202 is read by the reading unit 210, and the shading white plate 102 is read by the reading unit 110. Pieces of reference data to be used for shading correction by the reading units 210 and 110 are generated based on reading results of the shading white plates 202 and 102 obtained by the reading units 202 and 102, respectively. FIG. 5 is a flow chart for illustrating shading control processing of the reading unit 210.

In a case where the shading control processing of the reading unit 210 is to be performed, the CPU 321 moves the reading unit 210 to a position immediately below the shading white plate 202 by the optical system motor 326 (Step S501). The CPU 321 supplies power to the reading sensor 211 to bring the reading sensor 211 to a readable state (Step S502). The CPU 321 performs black shading. In the black shading, the CPU 321 acquires the reading result of the shading white plate 202 obtained by the reading sensor 211 while the LEDs 203a and 203b are in a turned-off state (Step S503). The CPU 321 examines whether or not a level of the acquired reading result (luminance value) falls within a first predetermined range serving as a determination criterion for determining whether or not the black shading has been normally performed (Step S504).

In a case where the level of the reading result does not fall within the first predetermined range (N in Step S505), the CPU 321 determines that the reading unit 210 may have failed or the position of the reading unit 210 is inappropriate. In this case, the CPU 321 cuts off power supply to the reading sensor 211 (Step S512), and in a case where the number of times of the black shading is smaller than two (N in Step S513), the processing is performed again from the movement of the reading unit 210 (Step S501). This is because it is to be avoided that the apparatus is immediately recognized as having failed to become unusable in a case where the reading unit 210 cannot accurately read the shading white plate 202 due to sudden troubles including electrical noise or the reading unit 210 being caught during the movement of the reading unit 210. Meanwhile, in order to prevent the black shading from being again performed many times in a case of an actual failure, in a case where the black shading fails twice (Y in Step S513), the CPU 321 determines that the reading unit 210 has failed (Step S514), and brings the shading control processing to an end.

In a case where the level of the reading result falls within the first predetermined range (Y in Step S505), the CPU 321 turns on the LEDs 203a and 203b (Step S506). The CPU 321 causes the optical system motor 326 to start the movement of the reading unit 210 from immediately below the shading white plate 202 to a position immediately below the flow reading glass 201, which is a position (reading position) for reading an image (Step S507). The CPU 321 performs the white shading during the movement of the reading unit 210. In the white shading, the CPU 321 acquires the reading result of the shading white plate 202 obtained by the reading sensor 211 while the LEDs 203a and 203b are in a turned-on state (Step S508). The CPU 321 examines whether or not the level of the acquired reading result (luminance value) falls within a second predetermined range serving as a determination criterion for determining whether or not the white shading has been normally performed (Step S509).

The CPU 321 examines whether or not the movement of the reading unit 210 to the position immediately below the reading position has been completed (Step S510). When the movement of the reading unit 210 has been completed (Y in Step S510), the CPU 321 determines whether or not the reading result of the white shading is normal (Step S511). In a case where the level of the reading result falls within the second predetermined range (Y in Step S511), the white shading has been normally performed, and hence the CPU 321 brings the shading control processing to an end while the LEDs 203a and 203b are in a turned-on state.

In a case where the white shading has been normally performed, the CPU 321 generates reference data based on the reading result of the white shading to store the reference data in the shading RAM 331. The shading corrector 332 performs the shading correction on the image data generated from the first surface of the original by the reading unit 210 based on the reference data stored in the shading RAM 331.

In a case where the level of the reading result does not fall within the second predetermined range (N in Step S511), the white shading has not normally been performed, and hence the CPU 321 again performs the processing from the black shading. Therefore, the CPU 321 turns off the LEDs 203a and 203b (Step S515), and cuts off the power supply to the reading sensor 211 (Step S512). In a case where the number of times of the white shading is smaller than two (N in Step S513), the CPU 321 again performs the processing from the movement of the reading unit 210 (Step S501). In a case where the white shading fails twice (Y in Step S513), the CPU 321 determines that the reading unit 210 has failed (Step S514), and brings the shading control processing to an end.

The shading control processing of the reading unit 210 is performed as described above. The shading control processing of the reading unit 110 is the same processing for performing the black shading and the white shading and generating reference data when both have been normally performed. However, the shading white plate 102 is attached to the flow reading glass 101 configured to be movable by the glass motor 122. When the shading control processing is started, the CPU 321 causes the glass motor 122 to move the flow reading glass 101 so as to locate the back surface shading white plate 102 on an opposing surface of the reading unit 110. This enables the reading unit 110 to read the shading white plate 102. The black shading and the white shading are performed based on the reading result (luminance value) of the shading white plate 102. After the shading white plate 102 has been read, the CPU 321 causes the glass motor 122 to move the flow reading glass 101 to the opposing surface of the reading unit 110 to read the original.

Skew Feeding Detection

The image reading apparatus 1000 starts to read the original by the reading units 210 and 110 based on the detection timing at which the leading edge of the original being conveyed is detected by the lead sensor 15. The reading unit 210 starts to read the image at a timing earlier by a predetermined time period than a timing at which the leading edge of the original reaches the reading position on the flow reading glass 201. This is because the image is to be prevented from being partially lost due to skew feeding of the original even when the original is conveyed within an upper limit of an allowable range of the skew feeding for the ADF 100.

Figure 6:
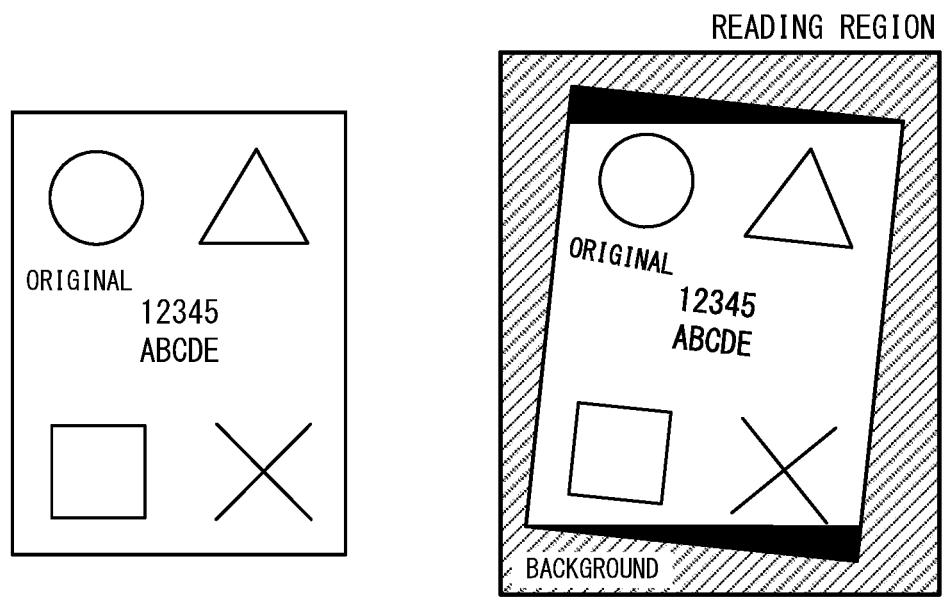
FIG. 6 is an explanatory diagram of an image read in a case where an original is skewed.

FIG. 6 is an explanatory diagram of an image read in a case where an original is skewed. In a case where the original is skewed (right part of FIG. 6), the opposing member 6 is also read as a background of the image of the original. Therefore, a reading result obtained by the reading unit 210 includes an image of the original and an image of the background. The skew feeding detector 333 of the image processor 325 extracts a boundary between the image of the original and the image of the background indicating the opposing member 6 from such a read image (right figure of FIG. 6).

Figure 7:
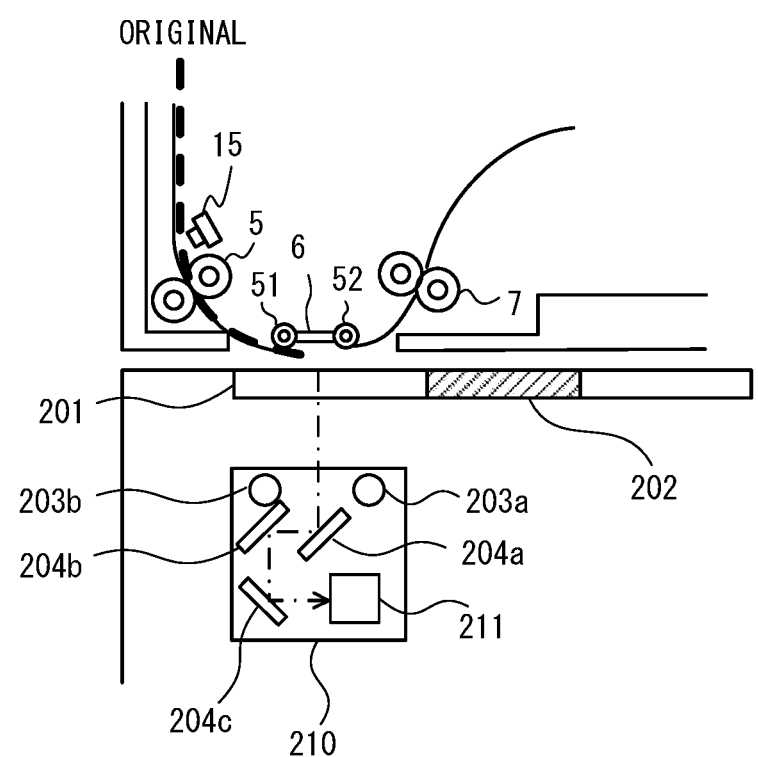
FIG. 7 is an explanatory diagram of a state of the original at a reading position.

FIG. 7 is an explanatory diagram of a state of the original at the reading position of the reading unit 210. As illustrated in FIG. 7, in a case where the leading edge of the original reaches the opposing member 6, the leading edge of the original is not nipped. Therefore, when the original is read, light emitted from the LEDs 203a and 203b creates a shadow between the original and the opposing member 6. This shadow is included in the read image. The skew feeding detector 333 can perform edge extracting processing on an image of the shadow, and can detect a position, a width, and a skew feeding angle of the original in the read image from the extracted edges.

The image (image data) read by the reading unit 210 is stored in the image memory 329 with the image of the original being skewed. In a case where the image data is transmitted to the controller 400, only an image portion (left part of FIG. 6) of the original is extracted and transmitted by the skew feeding corrector 334 based on the position, the width, and the skew feeding angle of the original, which have been detected by the skew feeding detector 333, to thereby correct the skew feeding.

Figures 8A, 8B:
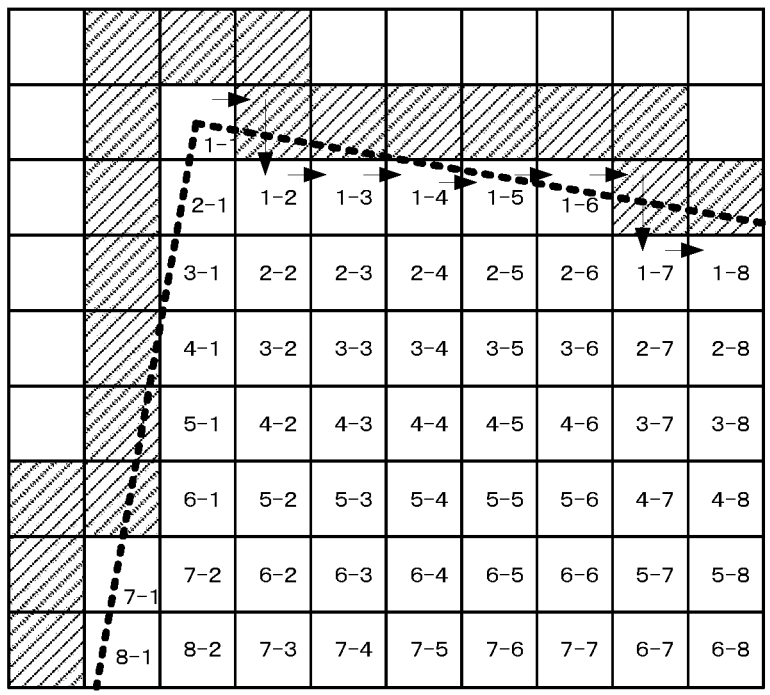
FIG. 8A and FIG. 8B are explanatory diagrams of skew feeding correction.

FIG. 8A and FIG. 8B are explanatory diagrams of the skew feeding correction. When the image data is transmitted to the controller 400, an order of transmitting pieces of data (pixel data) on each pixel included in the image data is changed based on the width and the skew feeding angle of the original, which have been detected by skew feeding detection processing, to thereby correct the skew feeding. FIG. 8A is an illustration of a read image (right part of FIG. 6), and one square region corresponds to one pixel. As a result of detecting the shadow of the end portion (dotted line portion) of the original in this image, the end portion of the original in units of pixels corresponds to a hatched pixel region. A rectangular region surrounded by four corners of the original (intersection point of the leading edge of the original and a left edge of the original, intersection point of the leading edge of the original and a right edge of the original, intersection point of the trailing edge of the original and the left edge of the original, and intersection point of the trailing edge of the original and a right edge of the original) is handled as an image of the original in an effective region (left part of FIG. 6).

A line that couples the intersection point of the leading edge of the original and the left edge of the original and the intersection point of the leading edge of the original and the right edge of the original corresponds to the leading edge of the original. In a case where the image data is transmitted to the controller 400, the skew feeding corrector 334 first transmits a Vsync signal, which is a sub-scanning reference signal indicating a head of one page, and an Hsync signal, which is a signal indicating a head in the main scanning direction. After that, the skew feeding corrector 334 sequentially transmits the image data on one line from the left end side of the original for each piece of pixel data corresponding to one pixel. In a case where the transfer of the image data on the one line at the head is completed, the skew feeding corrector 334 again transmits the Hsync signal, and then transfers the image data on the subsequent line.

Each of pixel regions 1-1, 1-2, 1-3, . . . of FIG. 8A is a piece of pixel data on one pixel to be transferred to the controller 400. The pixel region m-n (where m and n are integers) indicates the n-th piece of pixel data from the left end on the m-th line from the head. In this example, after the piece of pixel data on the pixel region 1-1 is transmitted, the next piece of pixel data on the right side of the piece of pixel data on the pixel region 1-1 is a shadow or has already been transferred, and hence the piece of pixel data on the pixel region 1-2 immediately below the pixel region 1-1 is transferred to the controller 400. Subsequently to the piece of pixel data on the pixel region 1-2, due to the next piece of pixel data on the right side neither being a shadow nor having already been transferred, the piece of pixel data on the pixel region 1-3 is transmitted as it is.

The controller 400 arranges the transmitted pieces of pixel data as they are for each line in order. Thus, as illustrated in FIG. 8B, the image of the original which is not skewed (left part of FIG. 6) is reproduced. In this manner, the skew feeding corrector 334 corrects the skew feeding by controlling the order of transmitting the pieces of pixel data included in the image data stored in the image memory 329 to the controller 400.

Figure 9:
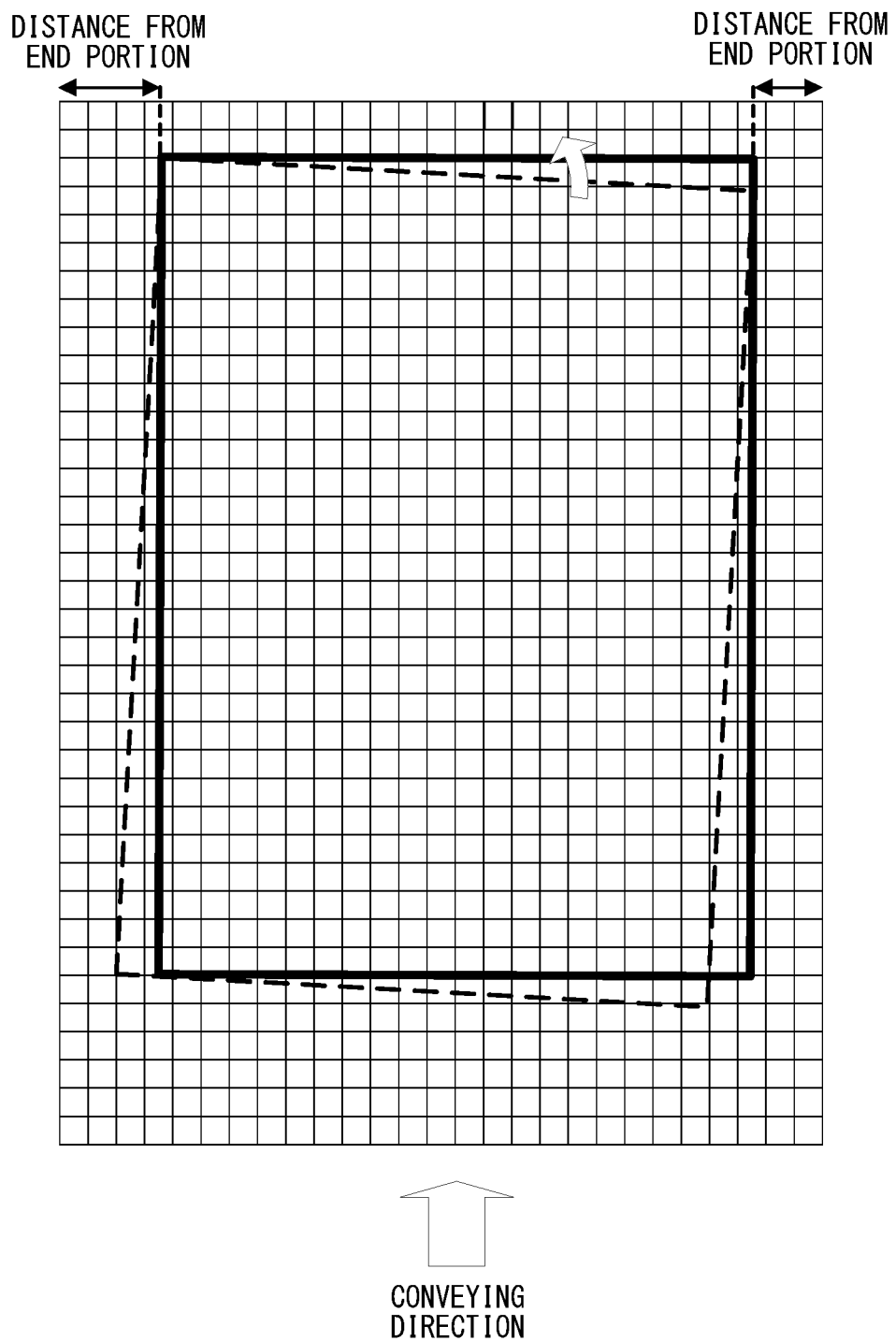
FIG. 9 is an explanatory diagram of a position of the original exhibited in a case where the original is read.

In this case, a position of the original exhibited when the original is read can be detected from the intersection point of the leading edge in the main scanning direction and the left end of the original and the intersection point of the leading edge and the right edge with respect to the position of the leading edge of the original obtained after correcting the skew feeding of the original image for the image data. FIG. 9 is an explanatory diagram of the position of the original exhibited when the original is read. In a case where the original conveying direction is the upward direction of FIG. 9, the main scanning direction corresponds to the left-right direction of FIG. 9. A region surrounded by the dotted line corresponds to the original image obtained before the skew feeding correction. A region surrounded by the solid line corresponds to the original image obtained after the skew feeding correction. The upper side corresponds to the leading edge side in the original conveying direction, and distances from end portions of the actually read region can be obtained. The reading unit 210 reads the original over a full width in the main scanning direction so as to prevent the original image from being partially lost in the main scanning direction even when the original is skewed.

Conveyance Stop Control for Original

Figure 10A:
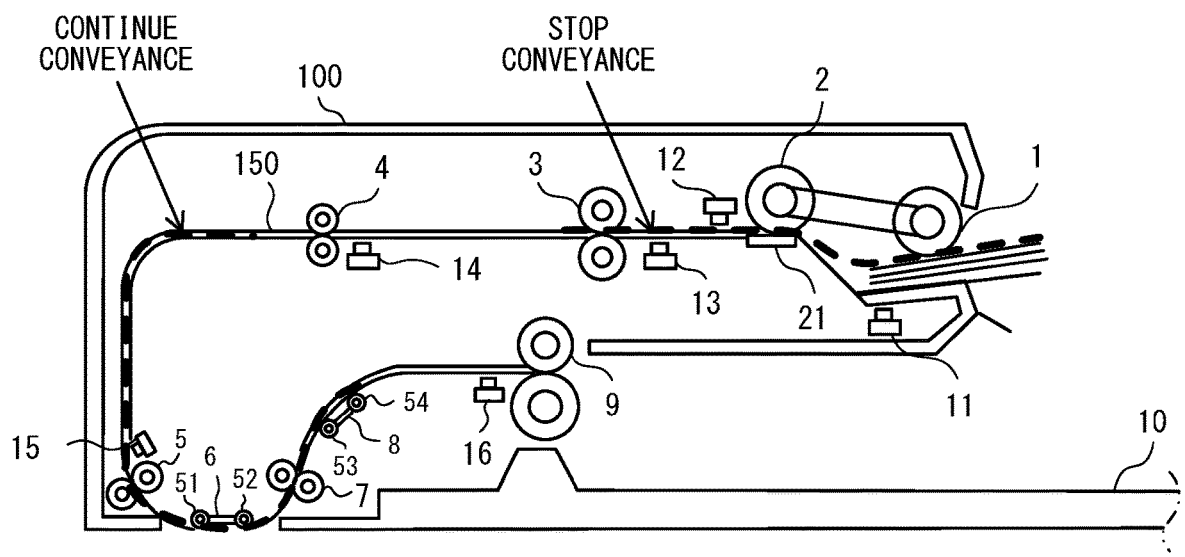
FIG. 10A and FIG. 10B are explanatory diagrams of conveyance stop control.
Figure 10B:
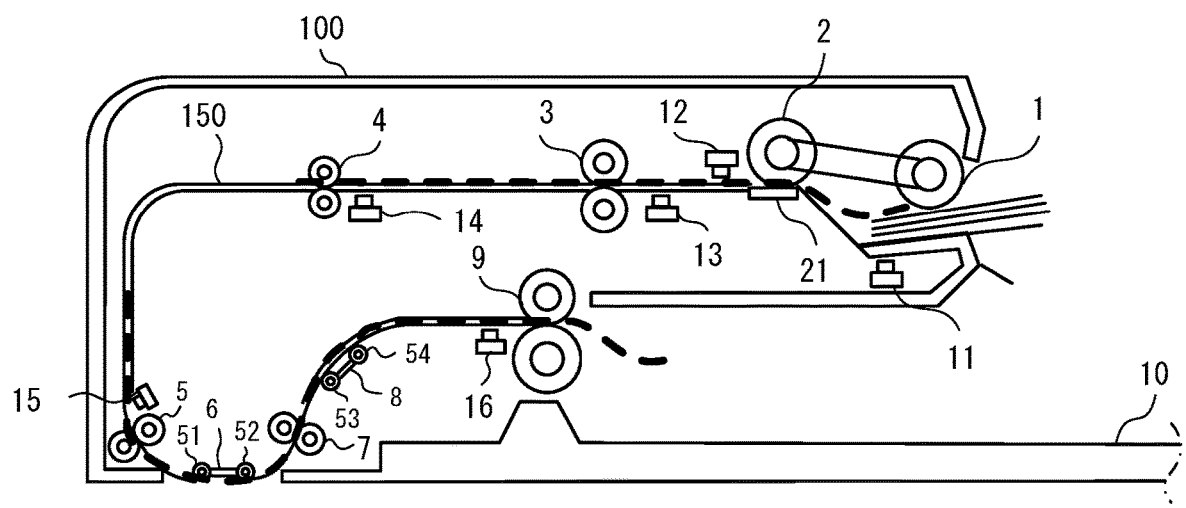
Figure 11:
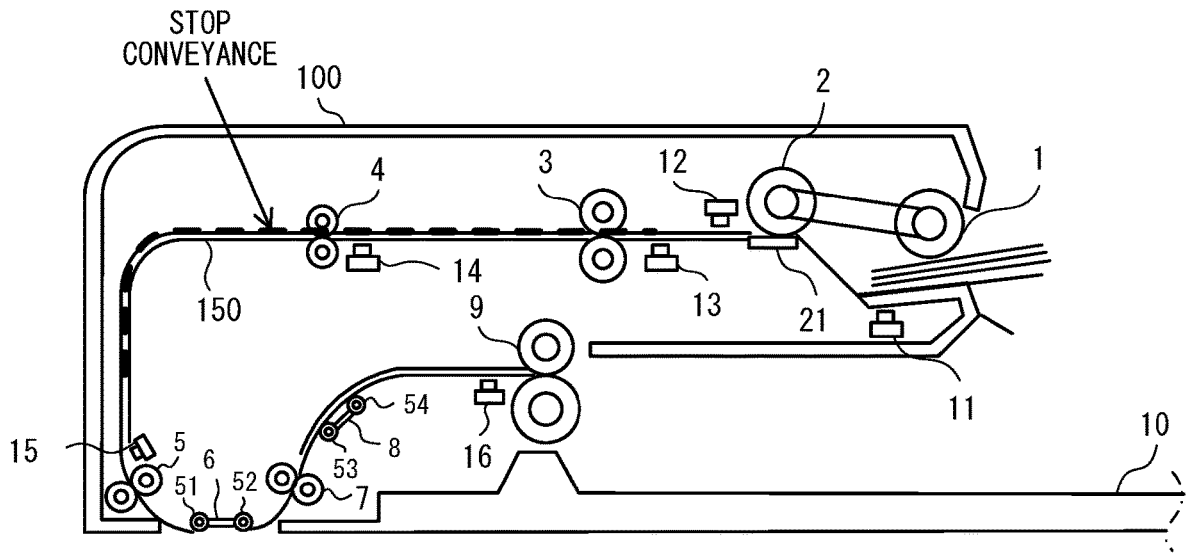
FIG. 11 is an explanatory diagram of the conveyance stop control.

Conveyance stop control performed in a case where one surface of the original is read (single-sided flow reading) is described. FIG. 10A, FIG. 10B, and FIG. 11 are explanatory diagrams of the conveyance stop control for the original.

Before the shading control is completed, the original cannot be read even when the original reaches the reading position. Therefore, before the first original is read, the original cannot be conveyed to the reading position of the reading unit 210 until the shading control is completed. In addition, there is no guarantee that adjustment performed by the shading control is successful, and hence the original cannot be conveyed to the reading position based on a timing at which the adjustment is predicted to be completed. In the first embodiment, the first original fed from the original tray 30 is conveyed to a predetermined position on the conveyance path 150 to stand by, and is conveyed to the reading position after the shading control is completed.

The shading control has already been completed for the second and subsequent originals, but the second and subsequent originals may be stopped for another reason. For example, in a case where the controller 400 is in a state in which the image data of the original cannot be received during other processing, the original that has already been conveyed and has not reached the reading position is temporarily stopped, and the original that has passed through the reading position is delivered. In this case, the conveyance motor 121 is already being driven as illustrated in FIG. 10A, and hence the rotation of the pickup roller 1, the separation roller 2, and the drawing rollers 3 is stopped by cutting off the sheet feeding clutch 123. Thus, it is possible to stop the conveyance of the original that has not reached the conveyance rollers 4. Meanwhile, as illustrated in FIG. 10B, the original whose leading edge has reached the conveyance rollers 4 continues to be conveyed by the conveyance rollers 4 due to the fact that the preceding original is delivered even when the sheet feeding clutch 123 is cut off. Thus, it is required to stop the conveyance motor 121 to stop the conveyance rollers 4. However, in a case where the conveyance motor 121 is stopped, all the rollers for conveying the original from the lead rollers 5 to the delivery rollers 9 are also stopped, and hence the conveyance of the previously conveyed original is also stopped.

In this case, when the conveyance of the original being read is stopped, a shock due to the stopping of the conveyance may occur to cause an abnormality to occur in the read image. Therefore, when the previously conveyed original is being read, the previously conveyed original cannot be stopped by the conveyance motor 121. In this case, in order to stop the conveyance of only the original that has not been read yet, the sheet feeding clutch 123 is to be cut off without failure before the leading edge of the original reaches the conveyance rollers 4.

Meanwhile, there is no original that precedes the first original. Therefore, as illustrated in FIG. 11, it is possible to stop the conveyance of the original by not only cutting off the sheet feeding clutch 123 but also stopping the conveyance motor 121. A limitation on a stop position of the original is only to secure a distance sufficient for the original to be stably conveyed to the reading position when the conveyance is resumed, and a relationship with the rollers coupled by the sheet feeding clutch 123, which has been described for the second and subsequent originals, is no longer required. Therefore, a standby position at which the original stands by until the shading control is completed can be set near the reading position for the original. Specifically, the first original is stopped at a position located downstream of the conveyance rollers 4 and upstream of the lead rollers 5.

Figure 12:
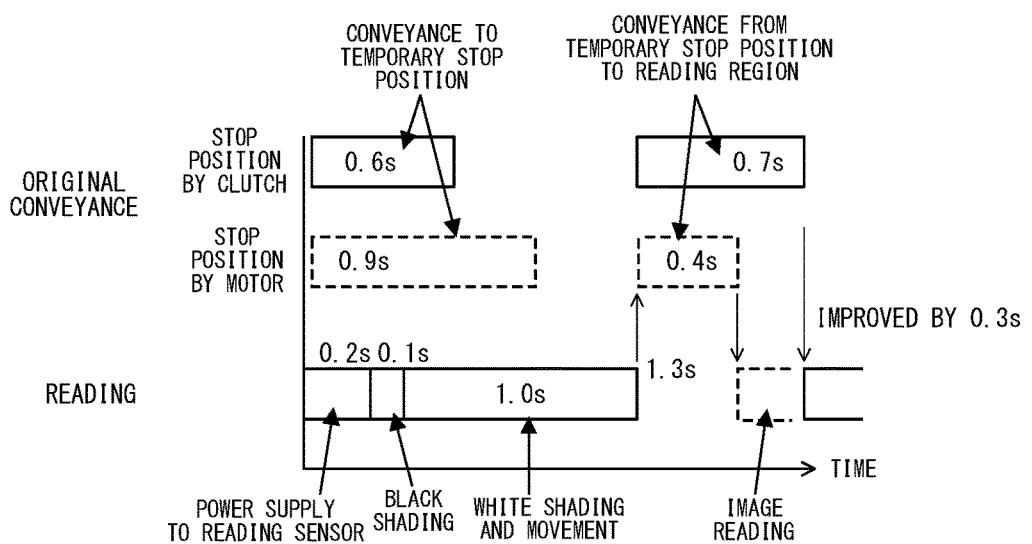
FIG. 12 is an explanatory diagram of an operation performed in a case where the conveyance has been resumed.
Figure 13:
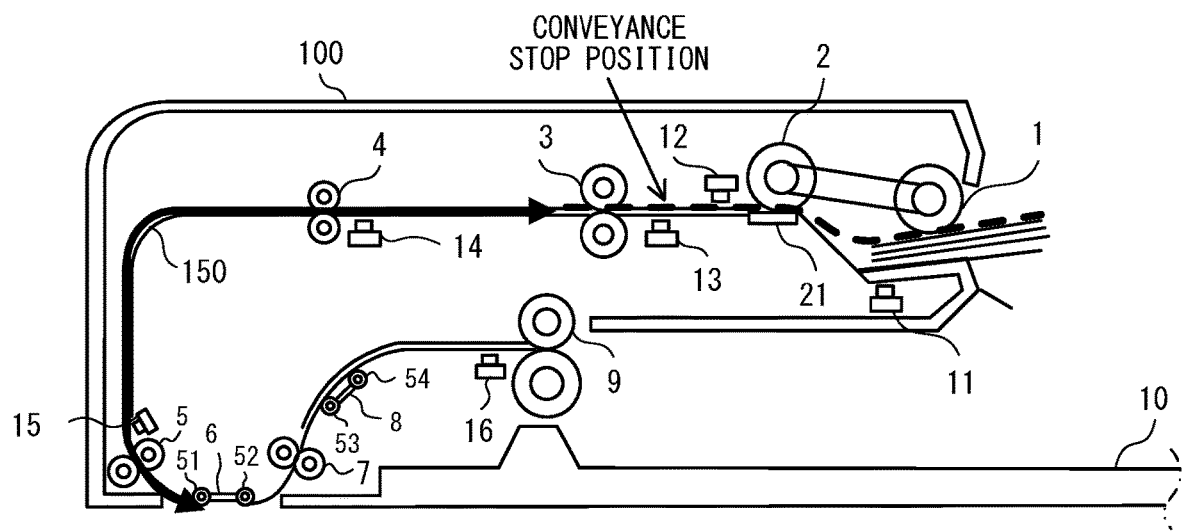
FIG. 13 is an explanatory diagram of the operation performed in a case where the conveyance has been resumed.
Figure 14:
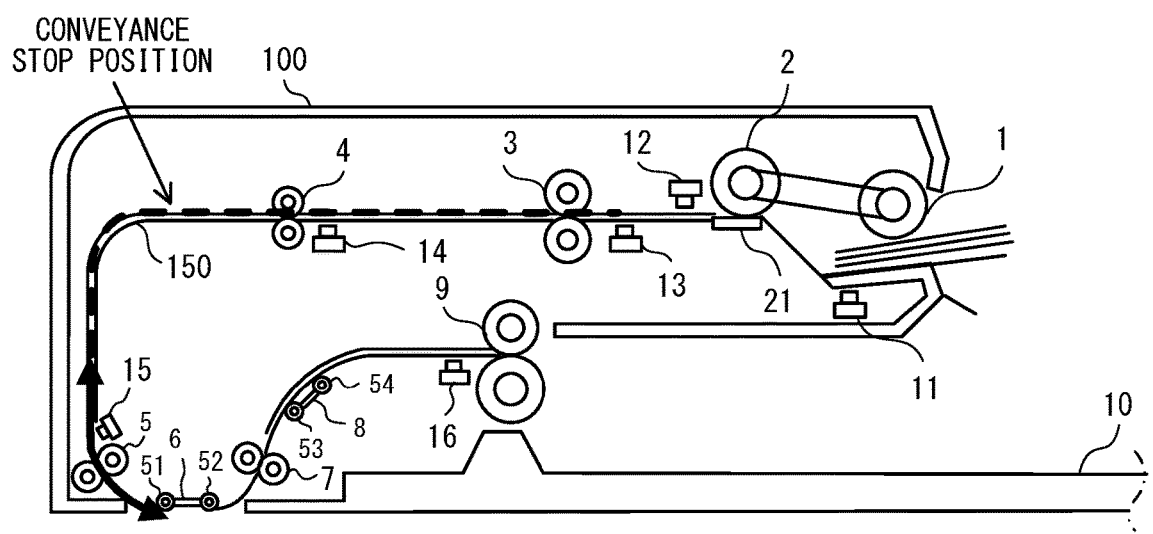
FIG. 14 is an explanatory diagram of the operation performed in a case where the conveyance has been resumed.

FIG. 12 to FIG. 14 are explanatory diagrams of an operation performed when the conveyance of the original has been resumed. The standby position at which the original stands by until the shading control is completed can be set near the reading position. Therefore, it is possible to shorten a conveyance time period after the completion of the shading control is followed by resumed conveyance until the original is conveyed to the reading position.

FIG. 12 is an illustration of time periods required for original conveyance in two patterns of conveyance stop by the sheet feeding clutch 123 and conveyance stop by the conveyance motor 121 and time periods required for preparation for the reading. As the specific time periods illustrated in the example of FIG. 12, it requires 0.6 second for the original to be fed from the original tray 30 to move to the stop position by the sheet feeding clutch 123, and it requires 0.9 second for the original to move to the stop position by the conveyance motor 121. FIG. 13 is an illustration of the stop position by the sheet feeding clutch 123, and FIG. 14 is an illustration of the stop position by the conveyance motor 121. The stop position by the conveyance motor 121 is closer to the reading position than the stop position by the sheet feeding clutch 123 is. As movement time periods from the two stop positions to the reading position, it requires 0.7 second for the original to move from the stop position by the sheet feeding clutch 123, and it requires 0.4 second for the original to move from the stop position by the conveyance motor 121. The time period required for the original to move from the stop position of the original to reach the reading position becomes shorter as the stop position of the original becomes closer to the reading position.

Time periods required for the reading unit 210 to prepare for the reading are 0.2 second taken until power is initially supplied to the reading sensor 211, 0.1 second for the black shading, and 1.0 second taken until the reading unit 210 moves to the reading region while the white shading is being performed. Thus, a time period required when a series of shading control procedures taken until reading preparation is completed is successful at one time is "0.2+0.1+1.0=(1.3 seconds)" from the start of a reading job. Therefore, until 1.3 seconds have passed since the feeding of the original is started, the movement of the original to the reading position cannot be resumed irrespective of whether the stop position of the original is based on the cutting off of the sheet feeding clutch 123 or based on the stopping of the conveyance motor 121. The specific time periods given above have values to be changed by designation of the reading job in the first embodiment. The original is required to stand by at the stop position by a time period by which the time period required for the reading unit 210 to prepare for the reading is longer than the time period required for the original fed from the original tray 30 to be conveyed to the stop position.

When the reading preparation of the reading unit 210 is completed, the original starts to move from the stop position to the reading position. The timing to start to read the first original is caused to become earlier in the case illustrated in FIG. 14 in which the original is again conveyed from the stop position by the stopping of the conveyance motor 121 than in the case illustrated in FIG. 13. With this control, it is possible to shorten the time period required after a reading instruction is received from the controller 400 until the reading of the first original is started.

Image Reading Processing for Original

When image reading (reading job) is instructed with a plurality of originals being placed on the original tray 30 of the ADF 100, the image reading apparatus 1000 starts image reading processing for the original. At that time, the conveyance of the second and subsequent originals is stopped by cutting off the sheet feeding clutch 123 without stopping the conveyance motor 121, and the conveyance of the first original is stopped immediately before the reading position by stopping the conveyance motor 121.

FIG. 15 to FIG. 19 are flow charts for illustrating the image reading processing. In the reading job in the first embodiment, the ADF 100 can simultaneously convey a plurality of originals to the internal conveyance path 150, and as the requirement arises, performs control relating to processing for temporarily stopping the conveyance.

<Overall Operation of Image Reading Processing>

Figure 15:
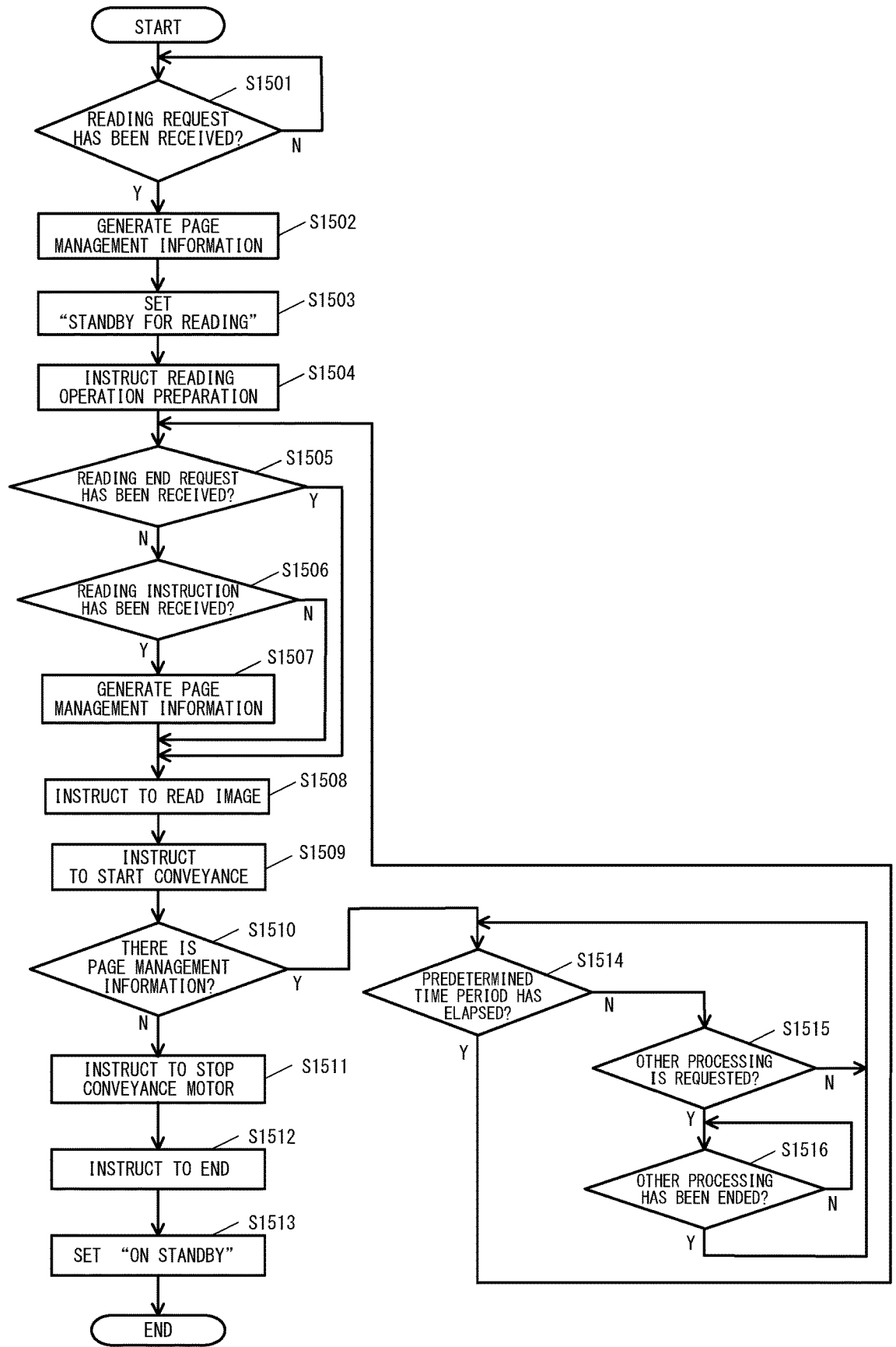
FIG. 15 is a flow chart for illustrating image reading processing.

FIG. 15 is a flow chart of the overall operation of the image reading apparatus 1000 performed during the image reading processing. Now, the image reading processing performed by the reading unit 210 is described.

Figures 19, 20:
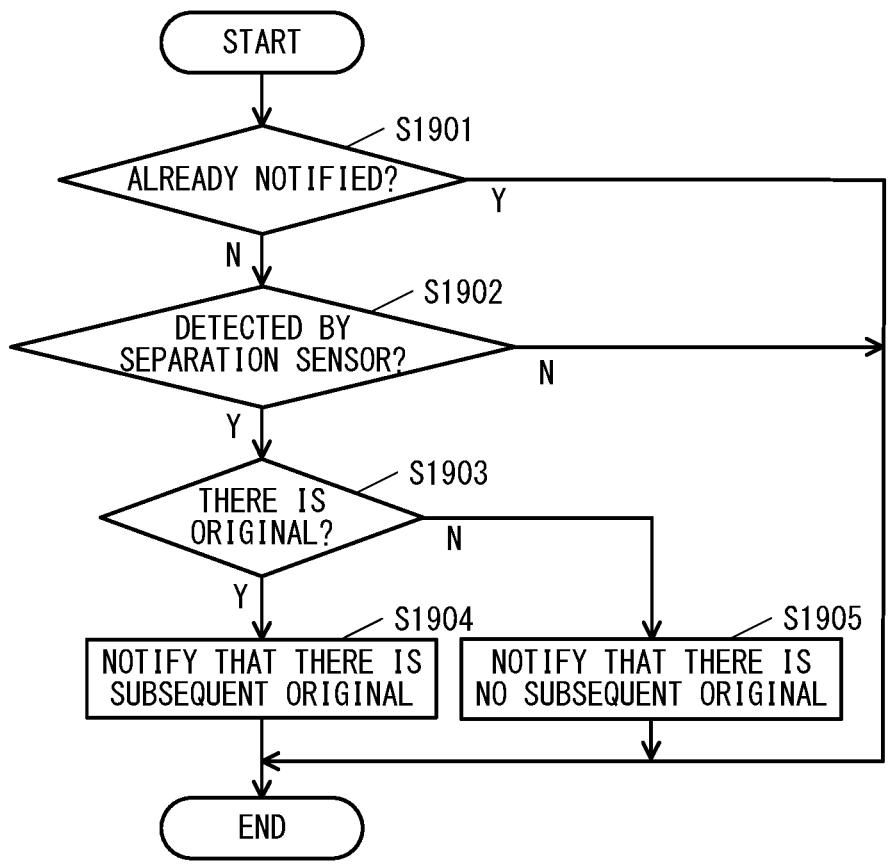
FIG. 19 is a flow chart for illustrating the image reading processing.
FIG. 20 is an explanatory diagram of page management information.

The CPU 321 of the reader controller 2001 stands by until a reading request for the first original of the original bundle S placed on the original tray 30 is received from the controller 400 (N in Step S1501). In a case where the CPU 321 receives the reading request (Y in Step S1501), the CPU 321 generates page management information for reading the first original (Step S1502). The page management information is stored in the RAM 323. FIG. 20 is an explanatory diagram of the page management information. The page management information includes information indicating a page number for identifying an original to be read, settings of various reading modes including selection from color reading and black and white reading, and a reading state of the original. One piece of page management information is generated for one original. The CPU 321 performs reading control and conveyance control for the original while referring to page management information. The CPU 321 sets the state of the image reading apparatus 1000 to "standby for reading" (Step S1503). The CPU 321 prepares for the reading operation including the shading control for the reading unit 210 (Step S1504). Through the processing of Step S1503 and Step S1504, the reading preparation for the entire image reading apparatus 1000 is performed.

After that, the CPU 321 performs the image reading processing for each original. First, the CPU 321 periodically examines whether or not a reading end request has been received (Step S1505). In a case where the user uses, for example, the operating device 405 to instruct to stop the image reading, the controller 400 notifies the CPU 321 of the reading end request. In a case where the reading end request has been received (Y in Step S1505), the CPU 321 instructs the reading unit 210 to read the image based on a piece of read page management information that has already been generated, and instructs the ADF 100 to start to convey the original (Step S1508 and Step S1509). In this case, no new piece of read page management information is generated.

In a case where the reading end request has not been received (N in Step S1505), the CPU 321 determines whether or not the reading instruction for one original has been acquired from the controller 400 (Step S1506). As described later, the CPU 321 of the reader controller 2001 notifies the controller 400 of the presence or absence of an original placed on the original tray 30 each time one original is read. Therefore, the controller 400 can also determine whether or not there is an original remaining on the original tray 30. The controller 400 transmits the reading instruction for one original to the CPU 321 when determining that there is an original remaining on the original tray 30, and does not transmit the reading instruction for one original to the CPU 321 when determining that there is no original remaining on the original tray 30.

In a case where the reading instruction for one original has been acquired (Y in Step S1506), the CPU 321 generates a new piece of read page management information (Step S1507). The CPU 321 instructs the reading unit 210 to read the image based on the newly generated piece of read page management information, and instructs the ADF 100 to start to convey the original (Step S1508 and Step S1509). In a case where the reading instruction for one original has not been acquired (N in Step S1506), the CPU 321 instructs the reading unit 210 to read the image based on the piece of read page management information that has already been generated, and instructs the ADF 100 to start to convey the original (Step S1508 and Step S1509).

The reading unit 210 starts the image reading processing in response to the image reading instruction received from the CPU 321. The image reading processing is described later in detail with reference to FIG. 16. The ADF 100 starts the conveyance processing in response to the instruction to start to convey the original, which is received from the CPU 321. The conveyance processing is described later in detail with reference to FIG. 17 to FIG. 19. The image reading processing and the conveyance processing are each performed as many times as the generated number of pieces of read page management information. The CPU 321 controls each of the image reading processing and the conveyance processing in a time-division manner.

The CPU 321 can perform, for example, multitask processing, and can execute time division processing on each task assuming that processing of each flow chart is set as a task. Specifically, the CPU 321 monitors each task of the processing in a time-division manner. When processing for standing by for a predetermined time period is required in each task of, for example, the conveyance processing relating to the original conveyance or the image reading processing for the reading unit 210, the CPU 321 switches one kind of processing to another kind of processing (conveyance processing, image reading processing, or overall control). This enables the CPU 321 to perform different kinds of processing required for double-sided reading for a plurality of originals in parallel.

Figure 21:
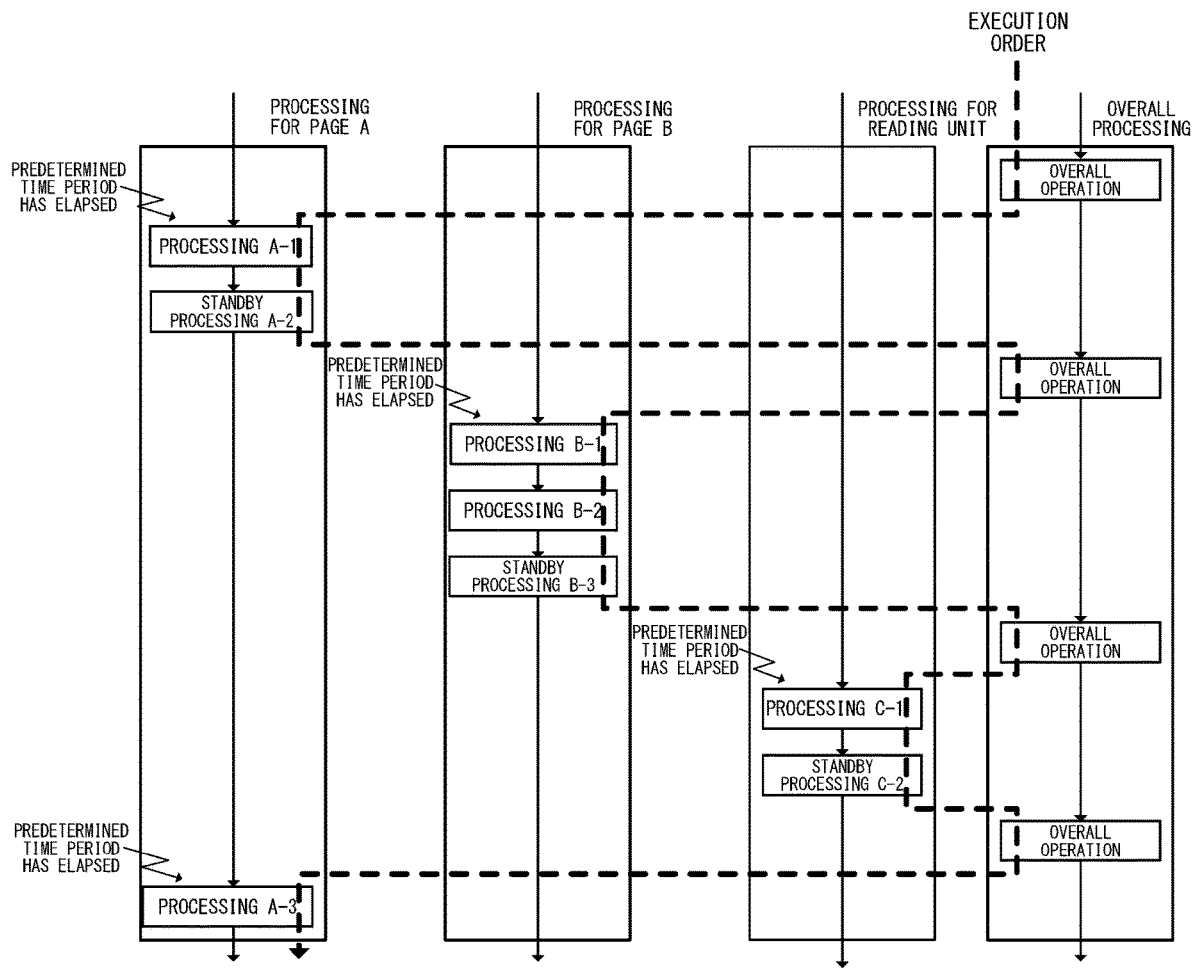
FIG. 21 is an explanatory diagram of multitask processing.

FIG. 21 is an explanatory diagram of the multitask processing performed by the CPU 321. The CPU 321 performs processing on page A (first original), processing on page B (second original), processing on the reading unit 210, and processing on the entire image reading apparatus 1000 in parallel in a time-division manner.

In the overall processing, the processing of Step S1505 for examining the reading end request, the processing of Step S1506 for examining the reading instruction for one original, and the processing of Step S1507 to Step S1510 are repeatedly performed. During this repetition, the CPU 321 monitors and executes each task existing in the time division processing, and switches the task to be executed in a case where a predetermined standby time period included in each task has elapsed.

In a case where the processing for each task is completed, the CPU 321 executes the processing for the subsequent task in accordance with an order of processing tasks on standby. When all the other tasks are in a standby state, the CPU 321 repeatedly performs simple loop processing (N in Step S1514 and N in Step S1515) by the task of performing the overall processing. During this repetition, the CPU 321 stands by until content to be processed by any one of the tasks occurs (Y in Step S1515) or until a cycle for the determination of Step S1505, Step S1506, and Step S1510 to be performed in the overall processing is reached (Y in Step S1514).

As an example, when processing A-1 is executed as processing for page A (first original) and then standby processing A-2 is executed, the other pages are also in the standby state, and hence the CPU 321 executes the overall processing. When the standby processing A-2 for a predetermined time period is finished, the CPU 321 stops the overall processing to execute processing B-1 for page B (second original). In the same manner, in a case where standby processing B-3 for page B is executed, the CPU 321 again executes the overall processing, and when the standby processing B-3 is finished, the CPU 321 performs processing C-1 on the reading unit 210. In this manner, the CPU 321 executes the conveyance processing for the originals of pages A and B, the image reading processing for the reading unit 210, and the overall processing of the reading job in parallel.

After instructing the processing for each original in accordance with the generated piece of read page management information, the CPU 321 again performs the processing of Step S1505 in a case where still remains a piece of page management information (Y in Step S1510). The CPU 321 repeatedly performs this processing until the images of all the originals on the original tray 30 have been read or until the reading end request is acquired to finish reading the images of the originals that have already been conveyed. The CPU 321 outputs a stop instruction for the conveyance motor (Step S1511) and an ending instruction for the processing of the reading unit 210 (Step S1512) in a case where remain no pieces of read page management information (N in Step S1510). The CPU 321 sets the state of the apparatus to be notified to the controller 400 to "on standby" (Step S1513) to bring a series of original reading jobs to an end.

<Image Reading Processing>

Figure 16:
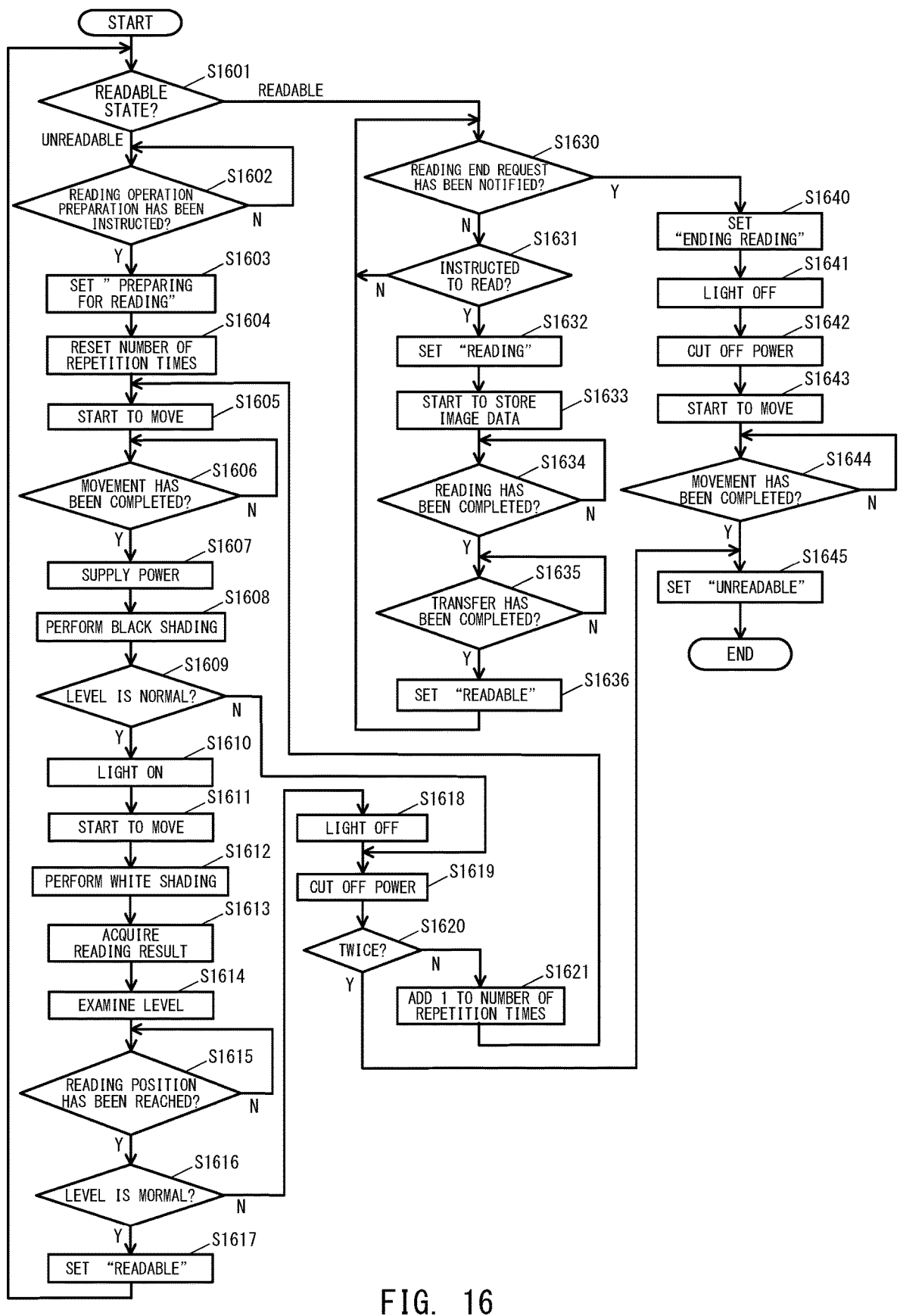
FIG. 16 is a flow chart for illustrating the image reading processing.

The image reading processing is described with reference to FIG. 16. This processing is executed in a case where the reading unit 210 receives an image reading instruction from the CPU 321 in the processing of Step S1508. This processing is also executed in a case where the reading unit 210 receives a reading operation preparation instruction in Step S1504, an ending instruction in Step S1512, and a reading instruction in Step S1760 described later.

The state of the reading unit 210 is not readable in a case where the reading request is received from the controller 400, and hence the CPU 321 starts processing for performing the reading preparation of the reading unit 210 ("unreadable" in Step S1601). The CPU 321 instructs the reading unit 210 to prepare for the reading operation based on the read page management information on the first original generated in the processing of Step S1502 (Y in Step S1602). The CPU 321 sets the state of the reading unit 210 to "preparing for reading" (Step S1603). The CPU 321 resets the number of times to repeat the shading control to "0" (Step S1604). The CPU 321 starts the movement of the reading unit 210 to a position immediately below the shading white plate 202 by the optical system motor 326 for the shading control (Step S1605). In a normal operation, the reading unit 210 is located immediately below the shading white plate 202, and hence this movement is not required, but the movement processing is performed to initialize the position.

In a case where the movement of the reading unit 210 has been completed (Y in Step S1606), the CPU 321 supplies power to the reading sensor 211 (Step S1607), and performs the black shading (Step S1608). The CPU 321 determines whether or not the level of the reading result (luminance value) acquired by the black shading is a normal value (Step S1609). When the level is a normal value (Y in Step S1609), the CPU 321 causes the LEDs 203a and 203b of the reading unit 210 to emit light (Step S1610). The CPU 321 starts the movement of the reading unit 210 to the reading position immediately below the flow reading glass 201 by the optical system motor 326 (Step S1611). The CPU 321 performs the white shading during the movement of the reading unit 210 (Step S1612). The CPU 321 determines whether or not the level of the reading result (luminance value) acquired by the white shading is a normal value (Step S1613 and Step S1614).

After the reading unit 210 reaches the reading position (Y in Step S1615), in a case where the level of the reading result (luminance value) acquired by the white shading is a normal value (Y in Step S1616), the CPU 321 changes the state of the reading unit 210 to "readable" (Step S1617). Thus, the reading unit 210 can perform the processing in the readable state in the subsequent processing of Step S1601.

As described in the shading control with reference to FIG. 5, there is also a case in which the luminance value acquired by the black shading or the white shading is not a normal value. In a case where the luminance value acquired by the white shading is not a normal value (N in Step S1616), the CPU 321 turns off the LEDs 203a and 203b of the reading unit 210 (Step S1618), and cuts off the power supply to the reading sensor 211 (Step S1619). After that, the CPU 321 again performs the shading control. In a case where the luminance value acquired by the black shading is not a normal value (N in Step S1609), the CPU 321 cuts off the power supply to the reading sensor 211 (Step S1619). After that, the CPU 321 again performs the shading control. When re-shading control is performed, the CPU 321 starts the movement of the reading unit 210 to the position immediately below the shading white plate 202 (Step S1605).

In a case where the re-shading control is performed, the CPU 321 examines the number of repetitions (Step S1620). In a case where the number of repetitions is smaller than 2 (N in Step S1620), the CPU 321 adds 1 to the number of repetitions (Step S1621), and then performs the shading control. In a case where the number of repetitions is 2 (Y in Step S1620), the CPU 321 determines that the image reading apparatus 1000 has failed. In this case, the CPU 321 sets the state of the reading unit 210 to "unreadable" (Step S1645) to bring the processing to an end.

In a case where the reading unit 210 is in the readable state ("readable" in Step S1601), the CPU 321 examines whether or not the reading end request has been notified from the controller 400 (Step S1630). In a case where the reading end request has not been notified (N in Step S1630), the CPU 321 examines whether or not the reading instruction has been received in Step S1760 described later (Step S1631). In a case where the reading instruction has been received (Y in Step S1631), the CPU 321 changes the state of the reading unit 210 to "reading" (Step S1632). The CPU 321 starts to store the image data representing the image of the original read by the reading unit 210 in the image memory 329 (Step S1633).

The CPU 321 determines whether or not the reading unit 210 has completed reading the image corresponding to a requested size (Step S1634). In a case where the reading has been completed (Y in Step S1634), the CPU 321 transfers the image data stored in the image memory 329 to the controller 400 (Step S1635). In a case where the transfer has been completed (Y in Step S1635), the CPU 321 sets the state of the reading unit 210 to "readable" (Step S1636) to return to the processing of Step S1630.

When the reading end request has been notified (Y in Step S1630), the CPU 321 sets the state of the reading unit 210 to "ending reading" (Step S1640). The CPU 321 turns off the LEDs 203a and 203b of the reading unit 210 (Step S1641), and cuts off the power supply to the reading sensor 211 (Step S1642). The CPU 321 starts the movement of the reading unit 210 to the position immediately below the shading white plate 202 by the optical system motor 326 (Step S1643). When the movement of the reading unit 210 has been completed (Y in Step S1644), the CPU 321 sets the state of the reading unit 210 to "unreadable" (Step S1645) to bring the processing to an end.

<Conveyance Processing for One Original>

The conveyance processing for the original is described with reference to FIG. 17 to FIG. 19. This processing is executed in a case where the ADF 100 receives the instruction to start to convey the original in the processing of Step S1508. This processing is executed after the read page management information is generated in the processing of Step S1502 or Step S1507.

The CPU 321 examines whether or not an original is placed on the original tray 30 based on the detection result obtained by the original presence detecting sensor 11 (Step S1701). In a case where the original is placed (Y in Step S1701), the CPU 321 examines whether or not the original is the first original (Step S1702). In the case of the first original (Y in Step S1702), the CPU 321 determines that the preceding original is not being conveyed on the conveyance path 150, and starts to drive the conveyance motor 121 (Step S1703). The CPU 321 couples the sheet feeding clutch 123 in order to start the feeding of the original (Step S1705).

In a case where the original is the second or subsequent original (N in Step S1702), the CPU 321 stands by until a distance appropriate for the feeding is secured as a sheet gap with respect to the preceding original being conveyed (N in Step S1704). In a case where an appropriate distance is secured as the sheet gap (Y in Step S1704), the CPU 321 couples the sheet feeding clutch 123 in order to start the feeding of the original (Step S1705). The appropriate distance of the sheet gap is, for example, a distance from a conveyance start position of the original to a detection position of the drawing sensor 13. The CPU 321 can determine that, in a case where the detection result obtained by the drawing sensor 13 is changed from a state of having detected the original to a state of not detecting the original, the trailing edge of the original has passed through the detection position of the drawing sensor 13, and the sheet gap having an appropriate distance has been secured. The CPU 321 determines that the trailing edge of the preceding original has passed through the position of the drawing rollers 3 by standing by for a predetermined time period after a timing at which the trailing edge of the original has passed through the detection position of the drawing sensor 13. Through the securing of the appropriate distance as the sheet gap, it is possible to suppress an influence of the coupling of the sheet feeding clutch 123 to be exerted on the preceding original.

The feeding of the original is started by coupling the sheet feeding clutch 123. The originals being conveyed through the conveyance path 150 are sequentially detected by the conveyance system sensor 120. The CPU 321 can detect the position of the original being conveyed on the conveyance path 150 by the sensor that has detected the original. The separation sensor 12 is described as an example. After the feeding is started, the CPU 321 stands by for a predetermined time period until the separation sensor 12 detects the original (N in Step S1707 and N in Step S1708). In a case where the separation sensor 12 detects the original before the predetermined time period elapses (Y in Step S1707), the CPU 321 stands by for a predetermined time period until the drawing sensor 13 configured to detect the original next detects the original (N in Step S1709 and N in Step S1710). In a case where the separation sensor 12 does not detect the original even after the predetermined time period has elapsed (N in Step S1707 and Y in Step S1708), the CPU 321 determines that the original is not normally being conveyed, and stops conveying the original (Step S1766). In the same manner, in a case where the drawing sensor 13 does not detect the original even after the predetermined time period has elapsed (N in Step S1709 and Y in Step S1710), the CPU 321 determines that the original is not normally being conveyed, and stops conveying the original (Step S1766). Specifically, the CPU 321 stops the conveyance of the original by stopping the conveyance motor 121 and cutting off the sheet feeding clutch 123.

In a case where the drawing sensor 13 detects the original before the predetermined time period elapses (Y in Step S1709), the CPU 321 examines whether or not the original is the first original (Step S1711). In a case where the original is the second or subsequent original (N in Step S1711), the CPU 321 stands by until the original reaches a temporary stop position of the original by the sheet feeding clutch 123 (N in Step S1712). The temporary stop position of the original by the sheet feeding clutch 123 is located between the drawing rollers 3 and the conveyance rollers 4. In a case where the original reaches the temporary stop position of the original by the sheet feeding clutch 123 (Y in Step S1712), the CPU 321 determines whether or not the image is readable by the reading unit 210 (Step S1713). The CPU 321 performs this determination based on, for example, whether or not the image data can be stored in the image memory 329. The image memory 329 is determined to be unable to store the image data when, for example, there is no free capacity.

In a case where the image is readable (Y in Step S1713), the CPU 321 continues to convey the original, and determines whether or not the registration sensor 14 has detected the original (Step S1717). In a case where the image is not readable (N in Step S1713), the CPU 321 cuts off the sheet feeding clutch 123 to stop feeding the original (Step S1714). The CPU 321 stands by until the image becomes readable under a state in which the feeding is stopped (N in Step S1715). In a case where the image is readable (Y in Step S1715), the CPU 321 couples the sheet feeding clutch 123 to resume the feeding of the original (Step S1716). After the feeding is resumed, the CPU 321 determines whether or not the registration sensor 14 has detected the original (Step S1717).

In a case where the original is the first original (Y in Step S1711), the CPU 321 continues to convey the original without determining readability, and determines whether or not the registration sensor 14 has detected the original (Step S1717). The conveyance of the first original can be stopped by the conveyance motor 121 without being stopped by the sheet feeding clutch 123. The temporary stop position by the conveyance motor 121 is set between the conveyance rollers 4 and the lead rollers 5.

In a case of an original having a short original length, the trailing edge of the original may pass through the detection position of the drawing sensor 13 at a timing at which the leading edge of the original reaches the detection position of the registration sensor 14. In this case, the detection result obtained by the drawing sensor 13 changes from the state of having detected the original to the state of not having detected the original at the timing at which the leading edge of the original reaches the detection position of the registration sensor 14. Therefore, the CPU 321 detects the presence or absence of the subsequent original based on the detection result obtained by the original presence detecting sensor 11 while standing by for a predetermined time period until the registration sensor 14 detects the leading edge of the original (N in Step S1717, N in Step S1718, and Step S1719).

FIG. 19 is a flow chart for illustrating processing for detecting the presence or absence of the subsequent original. In a case where the CPU 321 has already notified the controller 400 of the detection result of the presence or absence of the subsequent original, the CPU 321 skips this processing (Y in Step S1901). In a case where the controller 400 has not been notified (N in Step S1901), at a timing at which the detection result obtained by the separation sensor 12 changes from the state of having detected the original to the state of not having detected the original (Y in Step S1902), the CPU 321 examines the presence or absence of the original on the original tray 30 (Step S1903). The CPU 321 examines the presence or absence of the original on the original tray 30 based on the detection result obtained by the original presence detecting sensor 11. In a case where there is an original (Y in Step S1903), the CPU 321 notifies the controller 400 that the subsequent original is present (Step S1904). In a case where there is no original (N in Step S1903), the CPU 321 notifies the controller 400 that there is no subsequent original (Step S1905). The controller 400 determines whether or not to output the reading instruction for the original in the processing of Step S1506 in response to a notification issued in the processing of Step S1904 or Step S1905. The processing for detecting the presence or absence of the subsequent original is performed a plurality of times during the conveyance of one original. During the second and subsequent repetitions, the subsequent processing is not performed due to the processing of Step S1901. In a case where the detection result obtained by the separation sensor 12 does not change (N in Step S1902), the CPU 321 brings this processing to an end.

In a case where the predetermined time period has elapsed since the registration sensor 14 detects the original (Y in Step S1717 and Y in Step S1720), the CPU 321 determines that the original has been conveyed by the conveyance rollers 4 by a sufficient distance. In this case, the CPU 321 cuts off the sheet feeding clutch 123 (Step S1721). Thus, the pickup roller 1 stops rotating. The subsequent original stands by on the original tray 30. In a case where the registration sensor 14 does not detect the original even after the predetermined time period has elapsed (N in Step S1717 and Y in Step S1718), the CPU 321 determines that the original is not normally being conveyed, and stops conveying the original (Step S1766).

After the cutting off of the sheet feeding clutch 123, the CPU 321 examines whether or not the original is the first original (Step S1750). As described above, the temporary stop position by the conveyance motor 121 is set between the conveyance rollers 4 and the lead rollers 5. Therefore, in a case where the original is the first original (Y in Step S1750), the CPU 321 determines whether or not it is required to stop the original at the temporary stop position. During a period before the original reaches the temporary stop position (N in Step S1751), the CPU 321 detects the presence or absence of the subsequent original by the same processing as that of Step S1719 (Step S1752).

When the original reaches the temporary stop position (Y in Step S1751), the CPU 321 determines whether or not the image is readable in the same manner as in the processing of Step S1713 (Step S1753). The original is the first original of the reading job, and hence an area for storing the image data is secured in the image memory 329. However, there is a possibility that the reading preparation of the reading unit 210 described in the processing illustrated in FIG. 16 has not been finished. Specifically, in a case where the reading unit 210 is not set to the "readable" state in the processing of Step S1617 at the timing of the processing of Step S1753, it is determined that the reading preparation of the reading unit 210 has not been finished. In a case where the image is unreadable (N in Step S1753), the CPU 321 stops the conveyance motor 121 in order to stop the original conveyance (Step S1754). The original stops at the temporary stop position. The CPU 321 stands by until the image becomes readable (N in Step S1755). In a case where the image becomes readable (Y in Step S1755), the CPU 321 again drives the conveyance motor 121 to resume the conveyance of the original (Step S1756).

In a case where the image is readable (Y in Step S1753), in a case in which the image has become readable after the conveyance stop or in a case in which the original is the second or subsequent original (N in Step S1750), the CPU 321 stands by for the predetermined time period until the lead sensor 15 detects the original (N in Step S1715 and N in Step S1758). At this time as well, the CPU 321 detects the presence or absence of the subsequent original by the same processing as that of Step S1719 (Step S1759). In a case where the presence or absence of the subsequent original is notified in the processing of Step S1719 and Step S1752, the presence or absence of the subsequent original is not determined by the processing of Step S1901. In a case where the lead sensor 15 detects the leading edge of the original (Y in Step S1757), the CPU 321 instructs the reading unit 210 to start to read the image (Step S1760). The reading unit 210 reads the image from the original in response to this instruction (Y in Step S1631 and Step S1632 of FIG. 16). In a case where the lead sensor 15 does not detect the original even after the predetermined time period has elapsed (N in Step S1757 and Y in Step S1758), the CPU 321 determines that the original is not normally being conveyed, and stops conveying the original (Step S1766).

The CPU 321 conveys the original even after transmitting an instruction for reading start, and stands by for a predetermined time period until the delivery sensor 16 detects the original (N in Step S1761 and N in Step S1762). At this time as well, the CPU 321 detects the presence or absence of the subsequent original by the same processing as that of Step S1719 (Step S1763). In a case where the delivery sensor 16 does not detect the original even after the predetermined time period has elapsed (N in Step S1761 and Y in Step S1762), the CPU 321 determines that the original is not normally being conveyed, and stops conveying the original (Step S1766).

In a case where the delivery sensor 16 detects the leading edge of the original (Y in Step S1761), the CPU 321 stands by until the original delivery is completed after the trailing edge of the original passes through the detection position of the delivery sensor 16 (N in Step S1764). At this time as well, the CPU 321 detects the presence or absence of the subsequent original by the same processing as that of Step S1719 (Step S1765). When the delivery of the originals has been completed (Y in Step S1764), the CPU 321 deletes the page management information, and brings the conveyance processing for one original to an end (Step S1767).

With the above-mentioned processing, the first original is stopped by the conveyance motor 121, to thereby enable the original to be temporarily stopped at a position closer to the reading position of the reading unit 210 than the position at which the original is stopped by the sheet feeding clutch 123. Thus, the start of the image reading can be advanced. The conveyance of the second or subsequent original is temporarily stopped by the sheet feeding clutch 123 being cut off in a case where the second or subsequent original is located at the position closer to the original tray 30 side than the stop position by the conveyance motor 121 while the sheet gap with respect to the preceding original is maintained.

As described above, the image reading apparatus 1000 according to the first embodiment can set the standby position at which the original is temporarily stopped to a position immediately before the reading position without adding a clutch or a motor. Therefore, it is possible to advance the timing to start to read the first original while suppressing the cost. This can prevent an original being conveyed from not being read.

Second Embodiment

A configuration of the image reading apparatus 1000 according to a second embodiment of the present disclosure is the same as that of the image reading apparatus 1000 according to the first embodiment. The image reading apparatus 1000 according to the second embodiment is configured to perform control for maintaining a constant image reading cycle period. Specifically, the timing to resume the conveyance of the original, which has stopped with the leading edge having reached the drawing rollers 3, by coupling the sheet feeding clutch 123 is determined through use of not only the sheet gap but also a timing at which the leading edge of the preceding original is detected by the lead sensor 15.

A transfer timing of the image data to the controller 400 may vary due to variations in feeding interval depending on a friction state between the original and each roller conveying the original and due to images read from originals having original lengths varying one another. This exerts an influence on limitations on a minimum processing time exhibited in a case where the controller 400 transmits the image data to the image forming apparatus or an external apparatus. In order to ensure the minimum processing time required by the controller 400, a limitation is imposed on the distance of the sheet gap.

The time period after the leading edge of the original reaches the detection position of the lead sensor 15 until the image reading is started is determined by the reading mode determined in a case where the reading job is started. In view of this, the timing at which the leading edge of the original reaches the detection position of the lead sensor 15 is set constant, to thereby achieve the constant image reading cycle period. In a case where the image memory 329 cannot secure an area for storing the image data, the sheet feeding clutch 123 is not coupled, and hence the image reading is not started. Such a state occurs in a case where the controller 400 has a large processing load other than the reading and thus cannot receive the transfer of the image data from the image memory 329.

Figure 22:
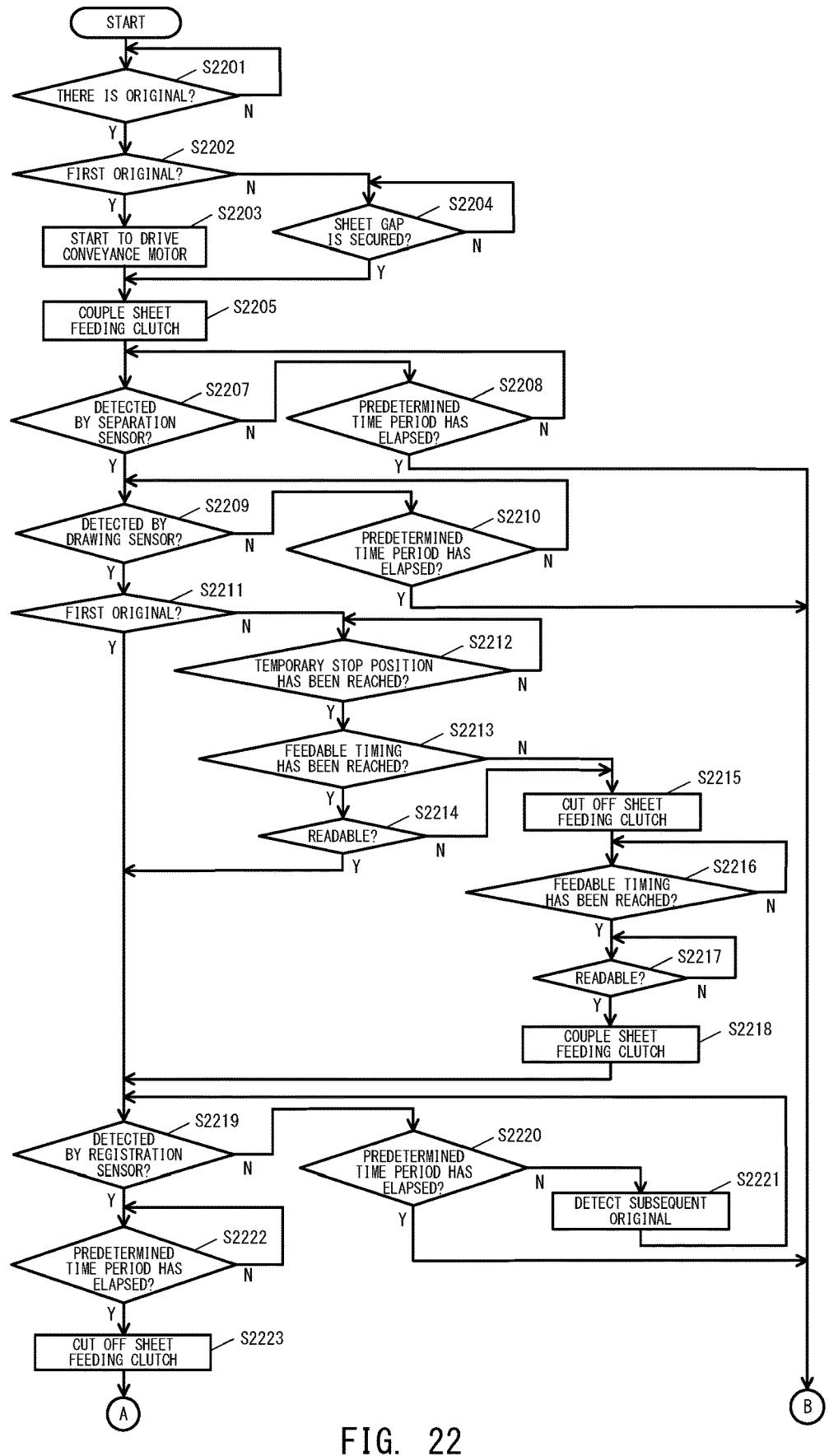
FIG. 22 is a flow chart for illustrating conveyance processing for the original.
Figure 23:
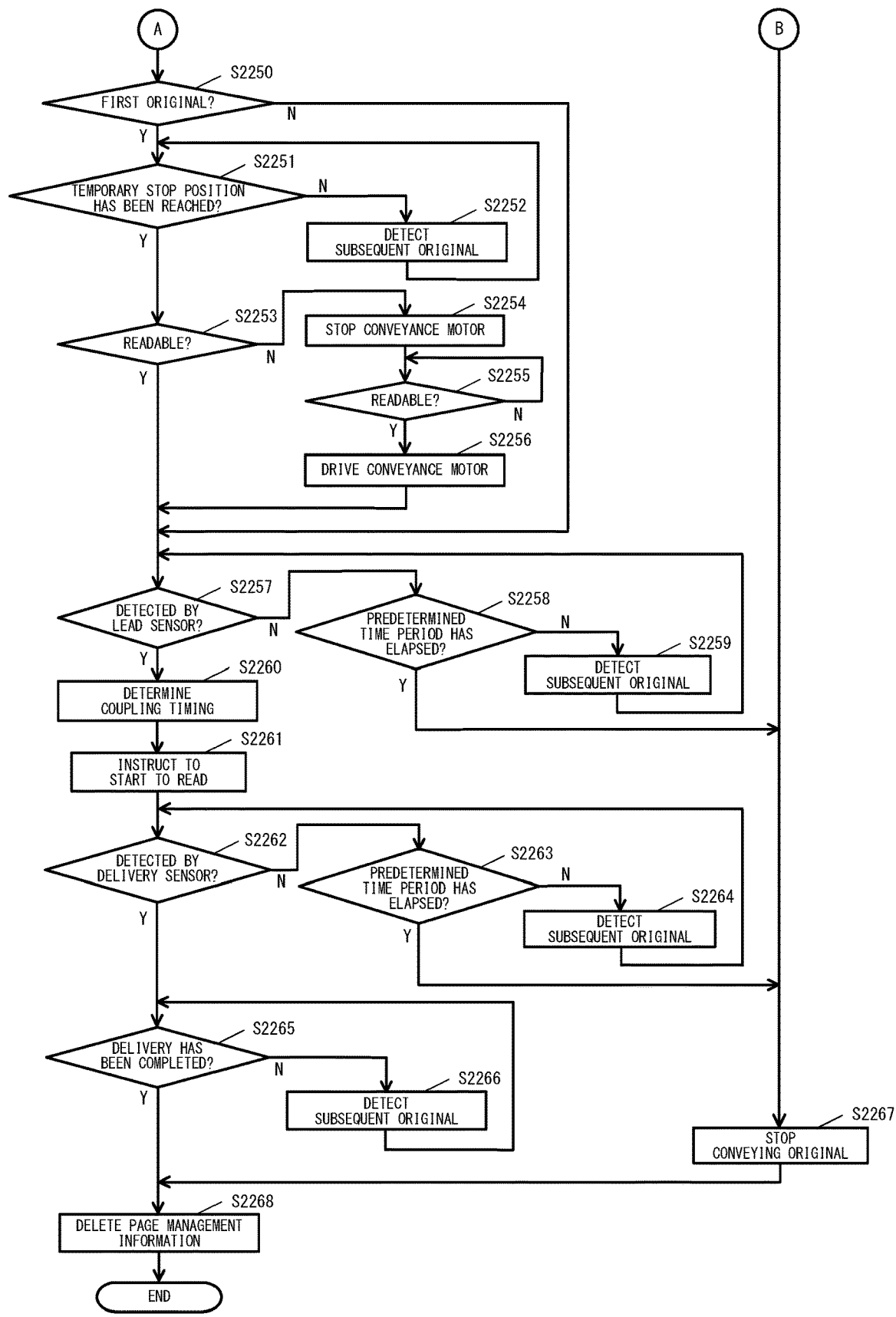
FIG. 23 is a flow chart for illustrating the conveyance processing for the original.

In the processing in the second embodiment in which the sheet feeding clutch 123 is coupled through use of the timing at which the leading edge of the preceding original is detected by the lead sensor 15 as well, overall control of the image reading apparatus 1000 has the same processing as that of the overall control of the image reading apparatus 1000 according to the first embodiment illustrated in FIG. 15. In addition, control of the reading unit 210 has the same processing as that of the reading unit 210 in the first embodiment illustrated in FIG. 16. Conveyance processing for the original is partially different from the processing in the first embodiment illustrated in FIG. 17 and FIG. 18. The differences are described below. FIG. 22 and FIG. 23 are flow charts for illustrating the conveyance processing for the original.

Figure 17:
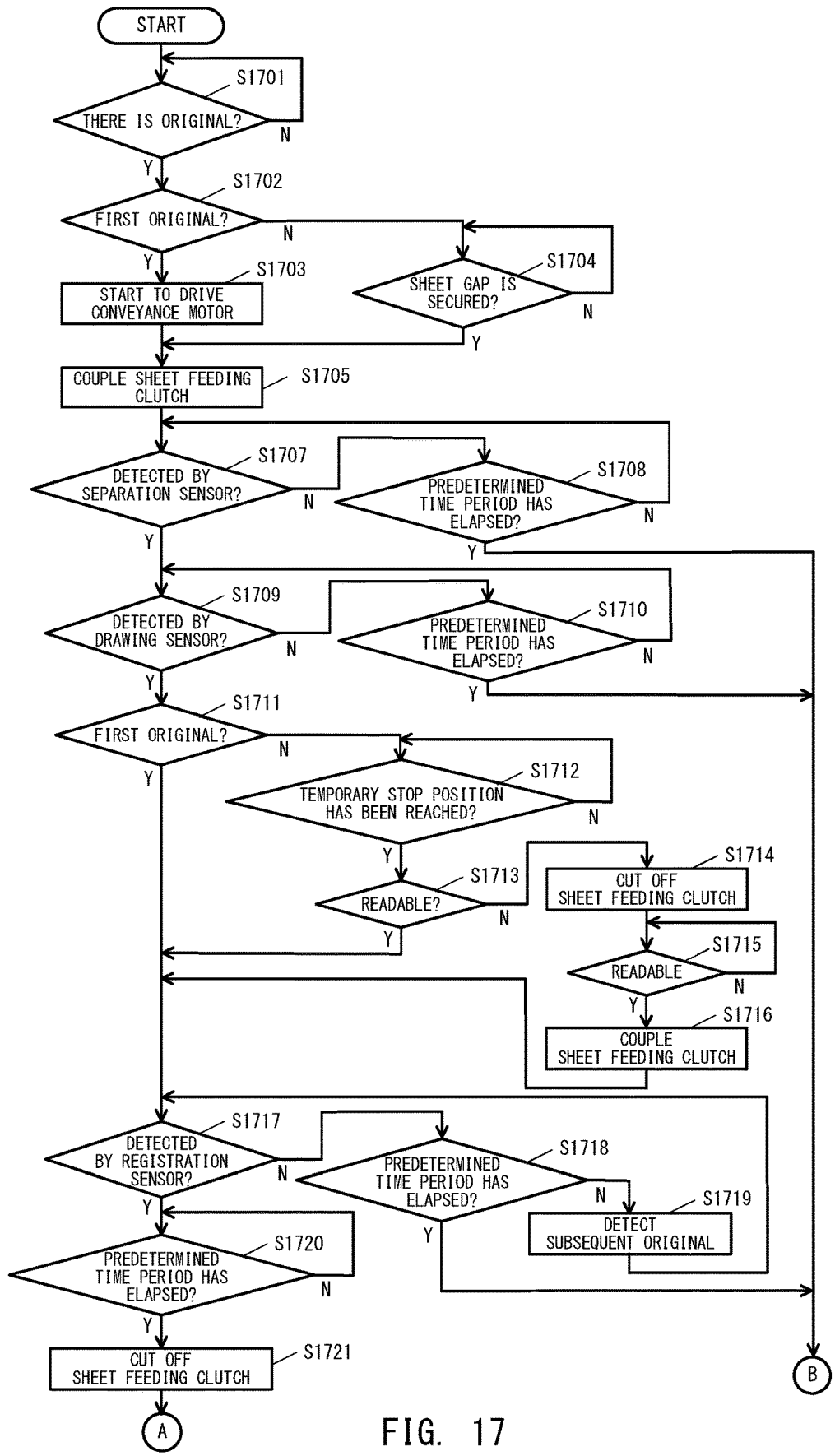
FIG. 17 is a flow chart for illustrating the image reading processing.

The processing performed after the presence or absence of the original on the original tray 30 is detected until the drawing sensor 13 detects the original (Step S2201 to Y in Step S2209) is the same as the processing of from Step S1701 to Step S1709 illustrated in FIG. 17. In a case where the drawing sensor 13 detects the original before the predetermined time period elapses (Y in Step S2209), the CPU 321 examines whether or not the original is the first original (Step S2211).

In a case where the original is the first original (Y in Step S2211), there is no preceding original, and hence the CPU 321 continues to convey the original to the detection position of the registration sensor 14 (Step S2219). In a case where the registration sensor 14 detects the original (Y in Step S2219), the CPU 321 subsequently performs the same processing as the processing of from Step S1720 to Step S1757 illustrated in FIG. 17 and FIG. 18 until the lead sensor 15 detects the original (Step S2222 to Step S2257). At the timing at which the lead sensor 15 detects the leading edge of the original, the CPU 321 determines a coupling timing of the sheet feeding clutch 123 for feeding the subsequent original (Step S2260).

Figure 24:
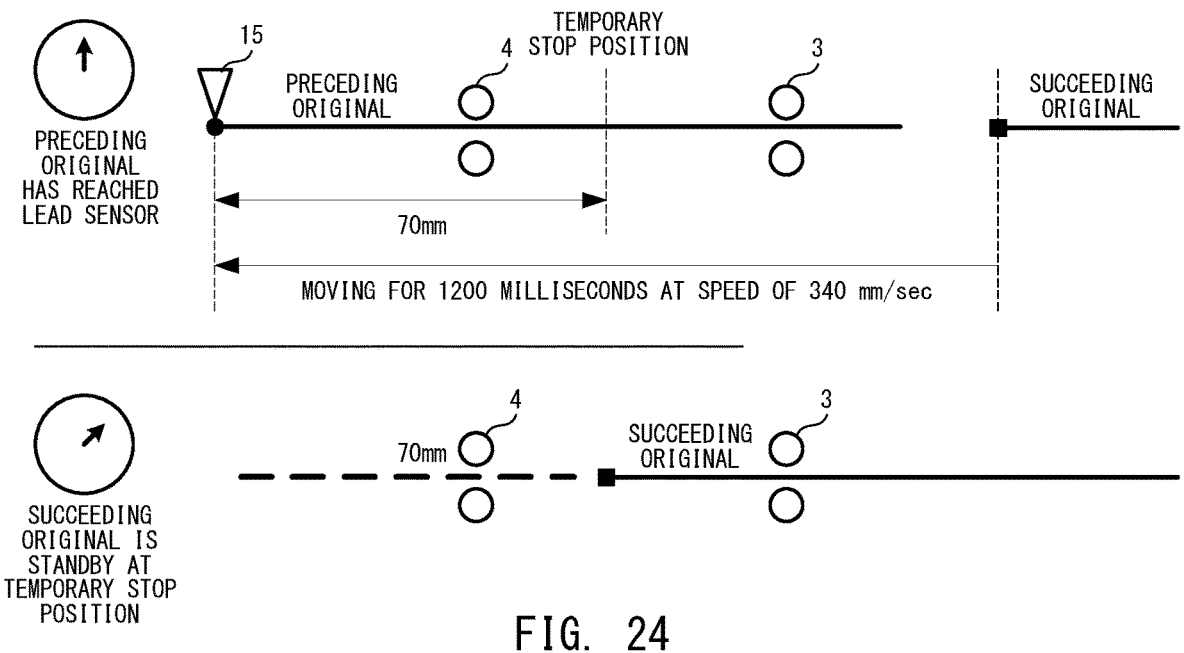
FIG. 24 is an explanatory diagram of processing for determining a coupling timing of a sheet feeding clutch.

FIG. 24 is an explanatory diagram of processing for determining a coupling timing of the sheet feeding clutch 123. The image reading apparatus 1000 has a productivity of 50 sheets/minute in a case where the content of the reading job is to read an A4-size original in a longitudinal orientation (conveyance length of 297 mm) in color. In this case, a conveying speed is 340 mm/s, and the stop position used in a case where the sheet feeding clutch 123 is cut off during the conveyance for the temporary stop is 70 mm upstream of the detection position of the lead sensor 15.

The cycle period for the original to reach the detection position of the lead sensor 15 is 1.2 seconds (=(60 seconds)/(50 sheets)), namely, 1,200 milliseconds. The time period for the original to move from the temporary stop position to reach the detection position of the lead sensor 15 due to the coupling of the sheet feeding clutch 123 is 206 milliseconds (=(70 mm)/(340 mm/s)). Therefore, when the timing to couple the sheet feeding clutch 123 in order to resume the conveyance of the subsequent original that has been temporarily stopped is 994 milliseconds (=(1,200 milliseconds)−(206 milliseconds)) after the leading edge of the original reaches the detection position of the lead sensor 15, the productivity of 50 sheets/minute is ensured. In an actual case, the coupling timing of the sheet feeding clutch 123 is determined by ensuring a margin in consideration of delays due to waiting for the coupling in a case where the sheet feeding clutch 123 is to be coupled, waiting for cutoff when the sheet feeding clutch 123 is to be cut off, and various factors for guaranteeing the productivity of 50 sheets/minute.

Figure 18:
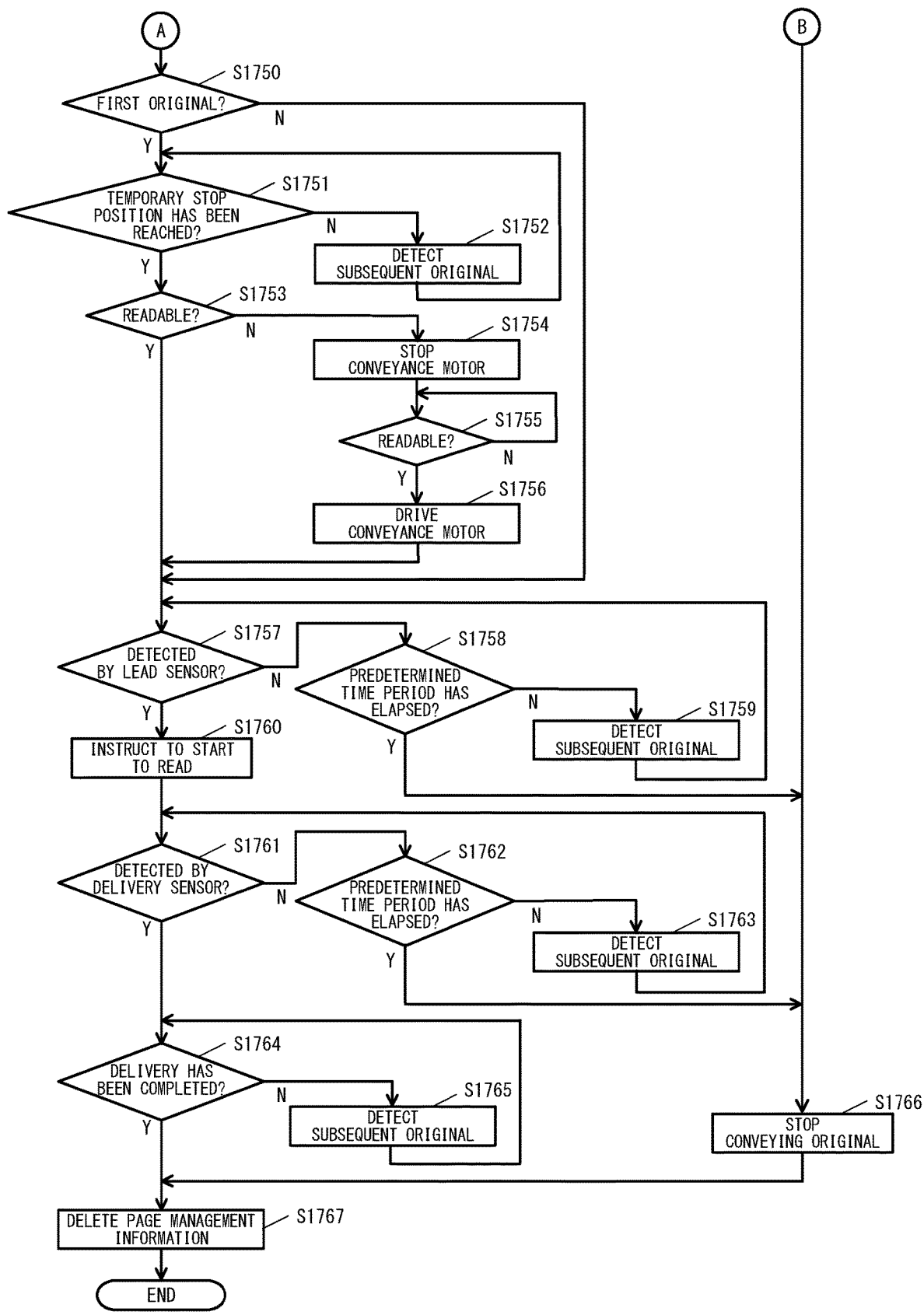
FIG. 18 is a flow chart for illustrating the image reading processing.

The CPU 321 that has determined the coupling timing of the sheet feeding clutch 123 instructs the reading unit 210 to start the image reading in the same manner as in the processing of from Step S1760 to Step S1767 of FIG. 18, and when the original subjected to the reading is delivered, deletes the page management information (Step S2262 to Step S2268).

In the processing of Step S2212 and the subsequent steps, the CPU 321 controls a timing to resume conveying the second and subsequent originals based on the coupling timing of the sheet feeding clutch 123 determined in the processing of Step S2260. In a case where the drawing sensor 13 detects the original (Y in Step S2209) and in a case where the original is the second or subsequent original (N in Step S2211), the CPU 321 stands by until the original reaches the temporary stop position by the sheet feeding clutch 123 (Step S2212). In a case where the original reaches the temporary stop position (Y in Step S2212), the CPU 321 determines whether or not the coupling timing of the sheet feeding clutch 123 determined in the processing of Step S2260 has been reached based on whether or not the preceding original has been detected by the lead sensor 15 (Step S2213).

The coupling timing of the sheet feeding clutch 123 determined with respect to the preceding original is determined for the stable productivity of the image reading apparatus 1000. In a case where the coupling timing of the sheet feeding clutch 123 has not been reached at the time of the processing of Step S2213 (N in Step S2213), the CPU 321 determines that the required sheet gap has not been secured, and cuts off the sheet feeding clutch 123 (Step S2215). The CPU 321 continuously determines whether or not the coupling timing of the sheet feeding clutch 123 has been reached with the sheet feeding clutch 123 being cut off (Step S2216). In a case where the coupling timing of the sheet feeding clutch 123 has been reached (Y in Step S2216), the CPU 321 determines whether or not the image is readable by the reading unit 210 (Step S2217). This processing is the same as the processing of Step S1713 illustrated in FIG. 17. In a case where the image becomes readable (Y in Step S2217), the CPU 321 couples the sheet feeding clutch 123 (Step S2218). After that, the CPU 321 performs the processing of Step S2219. To describe with the use of the above-mentioned specific numerical values, a succeeding original can be conveyed from its temporary stop after 994 milliseconds have elapsed since the timing for the preceding original in Step S2260.

As described above, the image reading apparatus 1000 according to the second embodiment determines the timing to resume the conveyance from the temporary stop position by the sheet feeding clutch 123 based on the timing at which the lead sensor 15 detects the original. This can prevent the distance (sheet gap) between the originals from becoming narrower due to variations in conveyance state of the originals. Therefore, the image reading cycle period becomes stable, and a cycle period for transferring the image data to the controller 400 also becomes stable. Therefore, the productivity of the entire system including the controller 400 also becomes stable. In addition, it is possible to prevent an original being conveyed from not being read.

Third Embodiment

A configuration of the image reading apparatus 1000 according to a third embodiment of the present disclosure is the same as that of the image reading apparatus 1000 according to the first embodiment. When the image reading apparatus 1000 continuously performs the reading operation on images for a long time, a change in temperature characteristics of the components of the reading unit 210 may exert an influence on image quality. Therefore, in a case where the number of originals in the reading job exceeds a predetermined number, it is required to perform the shading control again. This processing is required in a case where an image is read from a larger number of originals than the maximum number of sheets loadable on the original tray 30 by, for example, adding a new original at the bottom of the original bundle S during the feeding of the original. Specifically, it is required to perform the shading control again in a case where the number of continuously read originals exceeds 100 being the maximum number of sheets loadable on the original tray 30. After that, the shading control is performed in multiples of 100, namely, every 200 sheets, every 300 sheets, and so on. The shading control performed every 100 sheets is referred to as "re-shading."

During the continuous reading of originals, the reading unit 210 is at the reading position immediately below the flow reading glass 201. In order to perform the re-shading, the reading unit 210 is required to be moved to the position immediately below the shading white plate 202. In addition, in regard to the conveyance of the original, the image reading cannot be performed until the re-shading is completed, and hence it is required to keep the original stopped on the conveyance path 150. Therefore, the conveyance is stopped by the conveyance motor 121 in a case where the original can be stopped at an appropriate position by the stopping of the conveyance motor 121, instead of being uniformly stopped by the sheet feeding clutch 123.

Figure 25:
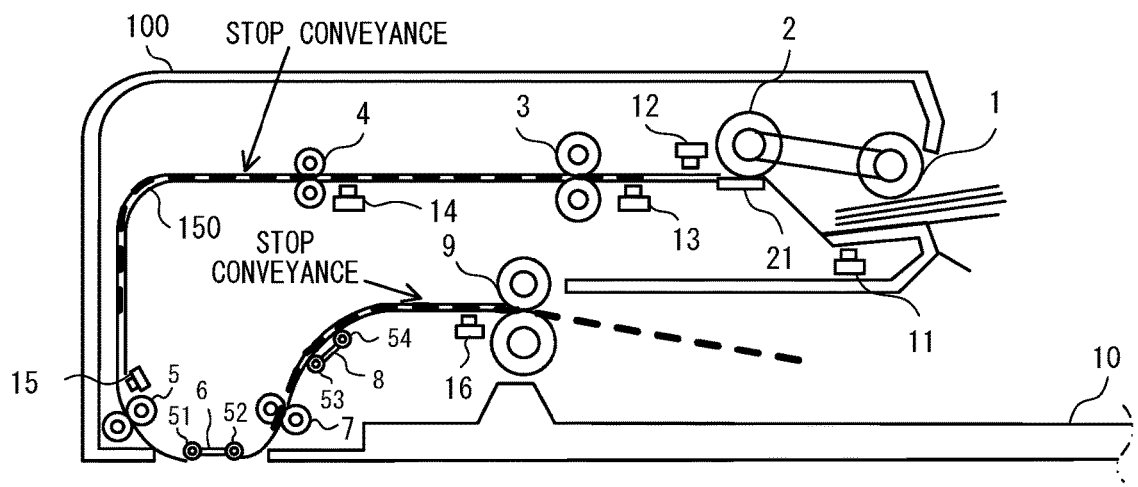
FIG. 25 is a diagram for illustrating an example of a temporary stop position of a conveyance motor.

As described with reference to FIG. 13 and FIG. 14, the stop position is relatively freely set for the first original as in the first embodiment. However, during the re-shading, there is a preceding original, and hence the conveyance cannot be stopped in a case where the image of the preceding original is being read. FIG. 25 is a diagram for illustrating an example of the temporary stop position of the conveyance motor 121. At such a stop position, there occurs no problem in a case where an image is read from one side, but in a case where images are read from both sides, the conveyance of the original is stopped in a case where the second surface is read. Therefore, in a case of the re-shading in a double-sided reading job, in a case where the distance between the originals is narrow, it is required to stop the conveyance by the sheet feeding clutch 123 in order to avoid the conveyance stop in a case where the image on the second surface is read.

In the processing in the third embodiment, overall control of the image reading apparatus 1000 has the same processing as that of the overall control of the image reading apparatus 1000 according to the first embodiment illustrated in FIG. 15. The control of the reading unit 210 is partially different from the processing in the first embodiment illustrated in FIG. 16 in a part in which the re-shading is performed. The conveyance processing for the original is partially different from the processing in the first embodiment illustrated in FIG. 17 and FIG. 18 in a part in which the re-shading is performed. The differences are described below.

Figure 26:
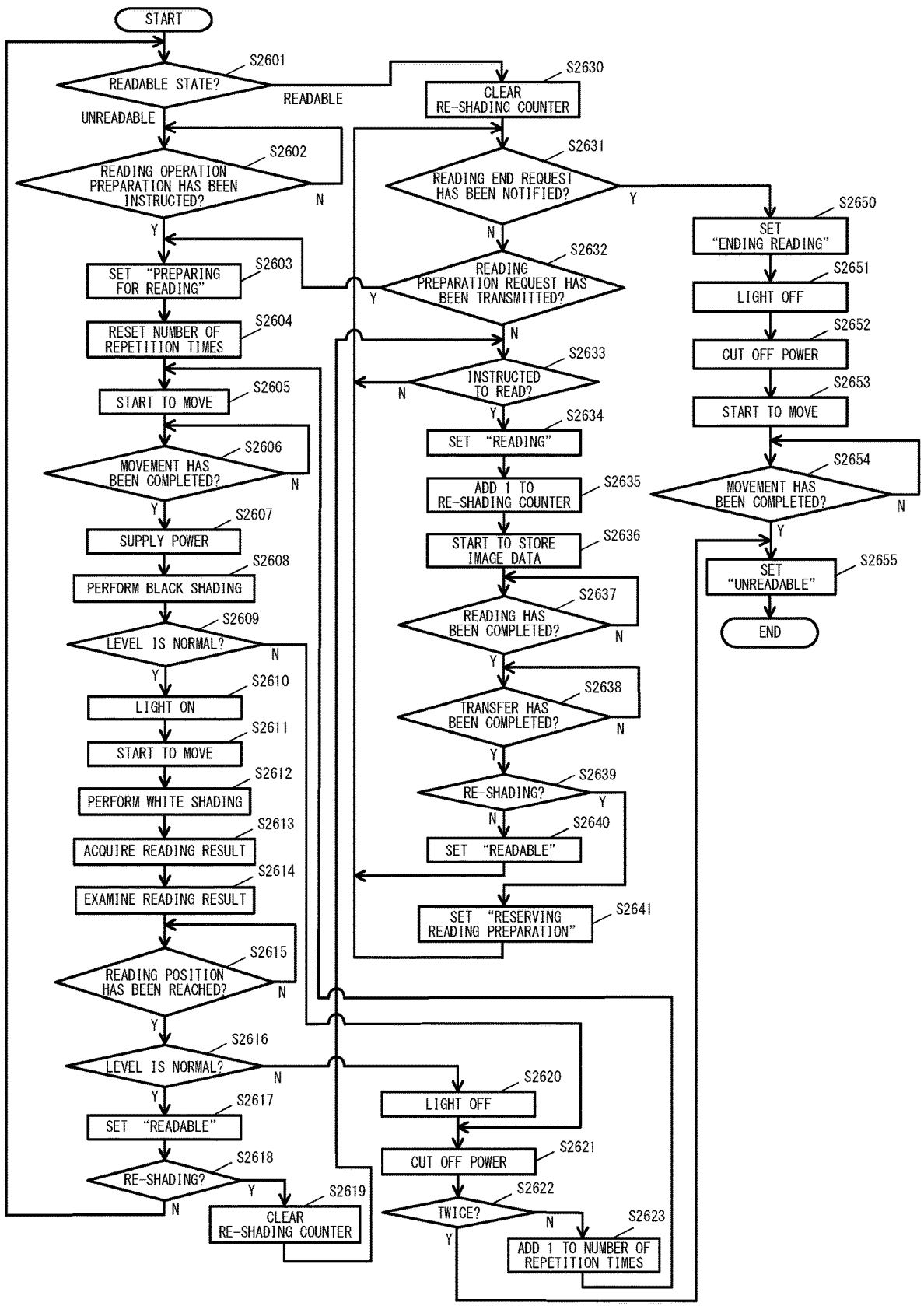
FIG. 26 is a flow chart for illustrating the image reading processing.

FIG. 26 is a flow chart for illustrating the image reading processing performed by the reading unit 210. The processing from the reading preparation to the setting of the state of the reading unit 210 to "readable" (Step S2601 to Step S2617) is the same as the processing of from Step S1601 to Step S1617 illustrated in FIG. 16.

In a case where the CPU 321 sets the state of the reading unit 210 to "readable" (Step S2617), the CPU 321 determines whether or not the currently executed shading control is the re-shading (Step S2618). In a case where the currently executed shading control is the re-shading (Y in Step S2618), the CPU 321 clears a re-shading counter for determining whether or not the re-shading can be executed to "0" (Step S2619), and performs the processing of Step S2633. In a case where the currently executed shading control is not the re-shading (N in Step S2618), the CPU 321 returns to the processing of Step S2601.

In a case where the state of the reading unit 210 is "readable" (Y in Step S2601), the CPU 321 determines that the shading control at the start of the job has been normally completed. In this case, the CPU 321 clears the re-shading counter to "0" (Step S2630). The CPU 321 examines whether or not the reading end request has been notified from the controller 400 (Step S2631). In a case where the reading end request has not been notified (N in Step S2631), the CPU 321 examines whether or not a reading preparation request has been transmitted to the reading unit 210 (Step S2632). In a case where the reading preparation request has been transmitted (Y in Step S2632), the CPU 321 performs the processing of Step S2603 and the subsequent steps for the re-shading.

In a case where the reading preparation request has not been transmitted (N in Step S2632), the CPU 321 examines whether or not the reading instruction has been received in Step S1760 (Step S2633). In a case where the reading instruction has been received (Y in Step S2633), the CPU 321 changes the state of the reading unit 210 to "reading" (Step S2634). The CPU 321 adds 1 to the re-shading counter (Step S2635). The re-shading counter indicates the number of originals read after the shading control.

The CPU 321 starts to store the image data representing the image of the original read by the reading unit 210 in the image memory 329 (Step S2636). The CPU 321 determines whether or not the reading unit 210 has completed reading the image corresponding to the requested size (Step S2637). In a case where the reading has been completed (Y in Step S2637), the CPU 321 transfers the image data stored in the image memory 329 to the controller 400 (Step S2638). In a case where the transfer has been completed (Y in Step S2638), the CPU 321 examines whether or not to perform the re-shading based on a value of the re-shading counter (Step S2639). In a case where the re-shading is to be performed (Y in Step S2639), the CPU 321 sets the state of the reading unit 210 to "reserving reading preparation" (Step S2641), and returns to the processing of Step S2631. In this case, the CPU 321 performs the processing to be performed in a case where the reading preparation request is transmitted in the subsequent processing of Step S2632 (Y in Step S2632). In a case where the re-shading is not to be performed (N in Step S2639), the CPU 321 sets the state of the reading unit 210 to "readable" (Step S2640), and returns to the processing of Step S2631.

In this manner, the image reading apparatus 1000 additionally includes the re-shading counter to perform the re-shading by again performing a series of the black shading and the white shading in a case where the reading preparation request is transmitted. The number of read originals is examined by the re-shading counter. In a case where the re-shading counter exceeds a predetermined value (for example, 100), the re-shading is performed.

In a case where the reading end request has been notified (Y in Step S2631), the CPU 321 sets the state of the reading unit 210 to "ending reading," turns off the LEDs 203a and 203b, and cuts off the power supply to the reading unit 210 (Step S2650 to Step S2655). The CPU 321 also moves the reading unit 210 to the position immediately below the shading white plate 202, and sets the state of the reading unit 210 to "unreadable" (Step S2653 to Step S2655) to bring the processing to an end. The processing of from Step S2650 to Step S2655 is the same as the processing of from Step S1640 to Step S1642 illustrated in FIG. 16.

Figure 27:
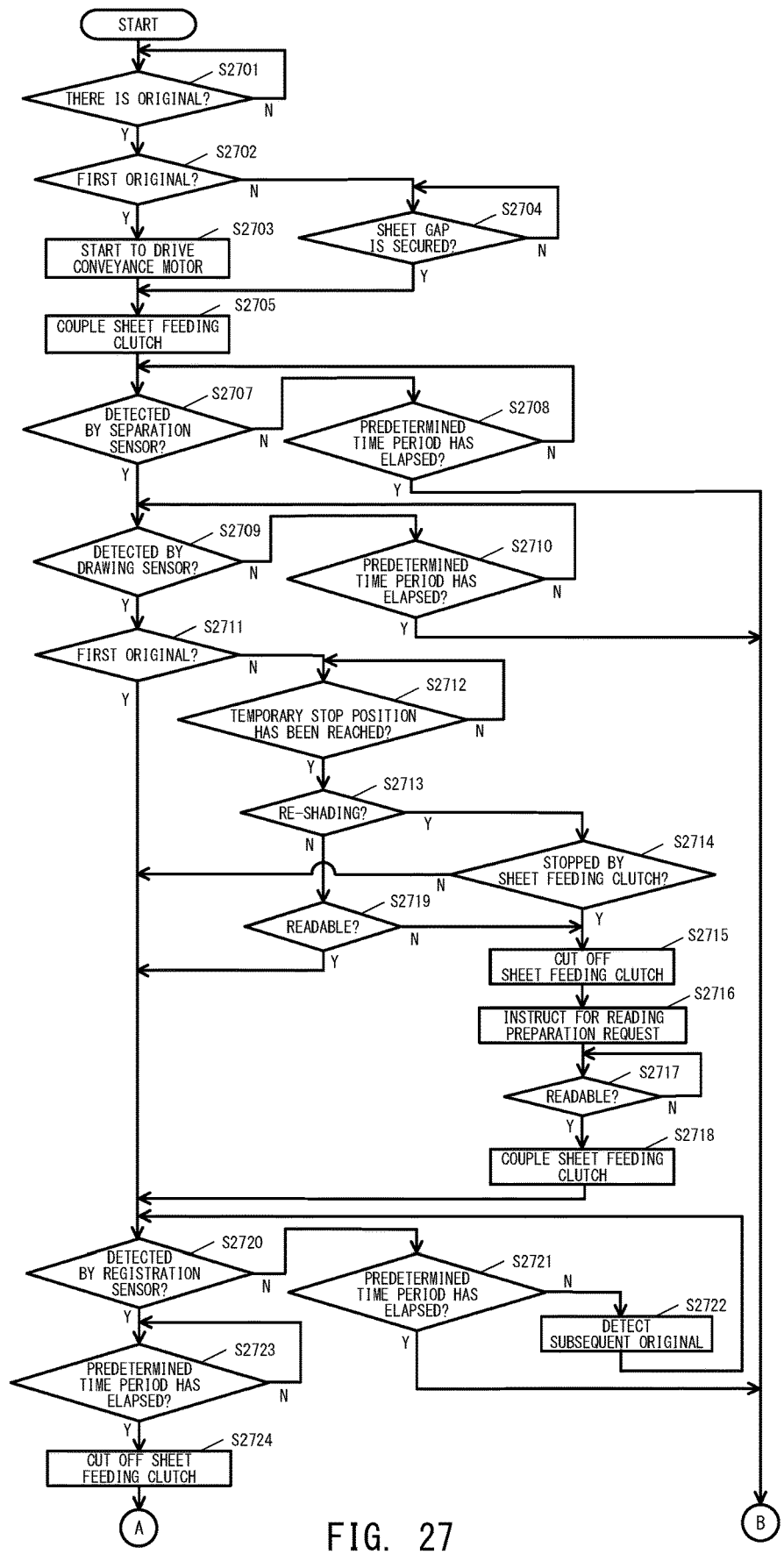
FIG. 27 is a flow chart for illustrating the conveyance processing for the original.
Figure 28:
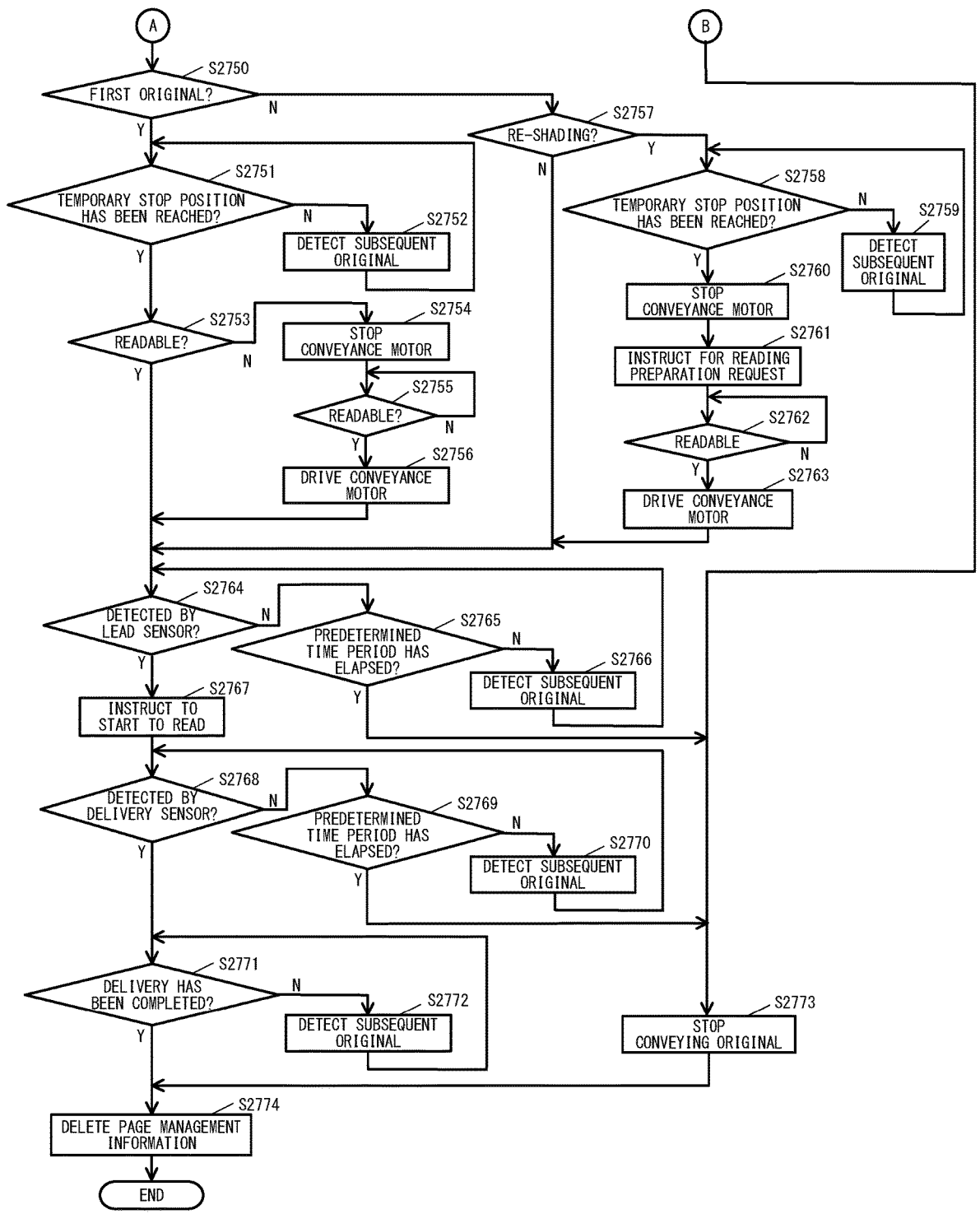
FIG. 28 is a flow chart for illustrating the conveyance processing for the original.

The differences of the conveyance processing for the original from the processing in the first embodiment are described below. FIG. 27 and FIG. 28 are flow charts for illustrating the conveyance processing for the original. In the third embodiment, the reading preparation request is transmitted by referring to the re-shading counter.

The processing from the detecting of the presence or absence of the original on the original tray 30 to the detecting of the original by the drawing sensor 13 (Step S2701 to Y in Step S2709) is the same as the processing of from Step S1701 to Step S1709 illustrated in FIG. 17. In a case where the drawing sensor 13 detects the original before the predetermined time period elapses (Y in Step S2709), the CPU 321 examines whether or not the original is the first original (Step S2711).

In a case where the original is the first original (Y in Step S2711), there is no preceding original, and hence the CPU 321 continues to convey the original until the registration sensor 14 detects the original (Step S2720). In a case where the original is the second or subsequent original (N in Step S2711), the CPU 321 stands by until the original reaches the temporary stop position by the sheet feeding clutch 123 (Step S2712). In a case where the original reaches the temporary stop position of the original by the sheet feeding clutch 123 (Y in Step S2712), the CPU 321 examines whether or not to perform the re-shading based on the value of the re-shading counter in the same manner as in Step S2639 (Step S2713).

In a case where the re-shading is to be performed (Y in Step S2713), the CPU 321 examines whether a stopping method is the conveyance stop by the sheet feeding clutch 123 (Step S2714). As described with reference to FIG. 25, the stopping method is determined by determining whether or not the position of the preceding original is a position at which the conveyance motor 121 can stop the original and by determining whether or not the sheet gap with respect to the preceding original is sufficient. In a case where the position of the preceding original is the position at which the conveyance motor 121 can stop the original and the sheet gap with respect to the preceding original is sufficient, the stopping method is the conveyance stop by the conveyance motor 121. In a case where the sheet gap with respect to the preceding original is not sufficient, the stopping method is the conveyance stop by the sheet feeding clutch 123.

In a case where the stopping method is the conveyance stop by the conveyance motor 121 (N in Step S2714), the CPU 321 does not perform the conveyance stop by the sheet feeding clutch 123, and therefore performs the processing of Step S2720. In a case where the stopping method is the conveyance stop by the sheet feeding clutch 123 (Y in Step S2714), the CPU 321 immediately cuts off the sheet feeding clutch 123 (Step S2715), and instructs the reading unit 210 for the reading preparation request (Step S2716).

The CPU 321 stands by until the state of the reading unit 210 becomes "readable" (Step S2717). In a case where the re-shading is completed in the processing of Step S2617, the state of the reading unit 210 becomes "readable." In a case where the transfer of the image data representing the image of the preceding original to the controller 400 is completed and the free capacity of the image memory 329 can also be secured (Y in Step S2717), the CPU 321 again couples the sheet feeding clutch 123 (Step S2718).

In a case where the re-shading is not to be performed (N in Step S2713), the CPU 321 determines whether or not the image is readable in the same manner as in the processing of Step S1713 (Step S2719). In a case where the image is not readable (N in Step S2719), the CPU 321 cuts off the sheet feeding clutch 123 (Step S2715) and performs the processing of Step S2716 and the subsequent steps. In a case where the image is readable (Y in Step S2719), the CPU 321 performs the processing of Step S2720.

The processing from the detecting of the original by the registration sensor 14 to the cutting off of the sheet feeding clutch 123 (Step S2720 to Step S2724) is the same as the processing of from Step S1717 to Step S1721 illustrated in FIG. 17. After that, the CPU 321 determines whether or not the original is the first original (Step S2750). In a case where the original is the first original (Y in Step S2750), the CPU 321 performs the same processing as the processing of from Step S1751 to Step S1756 illustrated in FIG. 17 (Step S2751 to Step S2756).

In a case where the original is the second or subsequent original (N in Step S2750), the CPU 321 examines whether or not to perform the re-shading based on the value of the re-shading counter (Step S2757). In a case where the re-shading is to be performed (Y in Step S2757), after the original reaches the temporary stop position (Y in Step S2758), the CPU 321 stops the conveyance motor 121 (Step S2760), and instructs the reading unit 210 for the reading preparation request (Step S2761). In this case, in a case where the re-shading has already been executed due to the stopping by the sheet feeding clutch 123, the re-shading counter is cleared by the processing of Step S2619 when the re-shading is completed. Therefore, in this case, the CPU 321 determines that the re-shading is not to be performed (N in Step S2757).

After instructing the reading unit 210 for the reading preparation request, the CPU 321 stands by until the state of the reading unit 210 becomes readable (Step S2762). The state of the reading unit 210 becomes readable in a case where the re-shading executed in response to the reading preparation request in the processing of Step S2761 is completed. In a case where the state of the reading unit 210 becomes readable (Y in Step S2762), the CPU 321 again drives the conveyance motor 121 (Step S2763).

After that, the CPU 321 performs the processing from the detecting of the original by the lead sensor 15 to the delivery of the original and the deleting of the page management information (Step S2764 to Step S2774) in the same manner as the processing of from Step S1757 to Step S1767 illustrated in FIG. 17. This brings the conveyance processing for the original to an end.

With the above-mentioned processing, the stop position of the original can be set in a vicinity of the reading position even when the re-shading is performed. Therefore, even when the re-shading or other such time-consuming processing is performed, it is possible to improve a timing to start to output each of the subsequent image reading results. In addition, it is possible to prevent an original being conveyed from not being read.

The above description of the first embodiment to the third embodiment has been directed to the case in which the image is read by the reading unit 210, but the same effect can also be produced by performing the same processing on the reading unit 110. In this manner, the image reading apparatus 1000 temporarily stops the conveyance of the original by stopping the drive of the conveyance motor 121 for the first original in the reading job and by cutting off the sheet feeding clutch 123 for the second and subsequent originals. Thus, it is possible to secure the standby position of the original immediately before the reading position without additionally providing a clutch. Therefore, it is possible to advance the timing to start to read the first original while suppressing the cost. In this manner, it is possible to prevent an original being conveyed from not being read.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-222399, filed Dec. 9, 2019, which is hereby incorporated by reference herein in its entirety.

What is claimed is:

1. An image reading apparatus configured to read an image of an original, the image reading apparatus comprising:
   an original tray on which the original is to be placed;
   a pickup roller configured to feed the original placed on the original tray to a conveyance path;
   a first conveyance roller configured to convey the original which is fed to the conveyance path by the pickup roller;
   a second conveyance roller, which is located downstream of the first conveyance roller in a conveying direction in which the original is conveyed, configured to convey the original which is conveyed by the first conveyance roller;
   a reading unit configured to read, at a reading position, an image of the original being conveyed by the first conveyance roller, the reading position being a position located downstream of the second conveyance roller in the conveying direction;
   a memory configured to store image data representing the image of the original read by the reading unit;
   a third conveyance roller configured to convey the original from which the image has been read by the reading unit;
   a motor configured to drive the pickup roller, the first conveyance roller, the second conveyance roller, and the third conveyance roller;
   a drive force transmitter configured to be switched between a first state and a second state, the first state being a state in which a drive force of the motor is transmitted to the pickup roller and the first conveyance roller and the second state being a state in which the drive force of the motor is prevented from being transmitted to the pickup roller and the first conveyance roller;

a receiver configured to receive an instruction indicating a start of a reading job for reading the image of the original; and a controller configured to control conveyance of the original, the controller being configured to start to feed the original placed on the original tray based on the instruction received by the receiver, wherein the controller is configured to control, in a case where a capacity of the memory becomes smaller than a predetermined amount during execution of the reading job, conveyance of a first original being read by the reading unit to be continuously conveyed and conveyance of a second original succeeding the first original to stop at a first position by switching the drive force transmitter from the first state to the second state, and wherein the controller is configured to control a third original to stop at a second position in a case where conveyance of the third original is to be stopped during a period from a timing the conveyance of the third original is started until a timing the third original reaches the reading position, the third original being an original which is read by the reading unit at a first time in the reading job, the second position being a position located downstream of the first position in the conveying direction.

2. The image reading apparatus according to claim 1, further comprising a shading corrector configured to perform shading correction on the image data, wherein the reading unit is configured to perform an acquisition operation for acquiring a shading correction value to be used in a case where the shading correction is performed, wherein the controller is configured to control the conveyance of the third original in the reading job to stop at the second position in a case where the shading correction value has not been acquired during the period after the conveyance of the third original is started until the third original reaches the reading position, and wherein the controller is configured to start to convey the original being stopped at the second position in a case where the shading correction value has been acquired.

3. The image reading apparatus according to claim 1, further comprising a fourth conveyance roller, which is provided between the second conveyance roller and the reading position in the conveying direction, and is configured to be driven by the motor to convey the original, wherein the first position is a position located downstream of the first conveyance roller and upstream of the second conveyance roller in the conveying direction, and wherein the second position is a position located downstream of the second conveyance roller and upstream of the fourth conveyance roller in the conveying direction.

4. The image reading apparatus according to claim 1, further comprising an inclination corrector configured to subject the image data to inclination correction for correcting an inclination of the image indicated by the image data.

5. The image reading apparatus according to claim 1, wherein the controller is configured to control the conveyance of the original performed by the pickup roller and the first conveyance roller to stop by switching the drive force transmitter to the second state, and to control the conveyance of the original performed by the second conveyance roller and the third conveyance roller to stop by stopping an operation of the motor.

* * * * *